(12) United States Patent
Stark et al.

(10) Patent No.: US 9,067,671 B2
(45) Date of Patent: Jun. 30, 2015

(54) VISUAL LOCALIZATION OF UNMANNED AERIAL VEHICLES BASED ON MARKER DETECTION AND PROCESSING

(71) Applicant: DISNEY ENTERPRISES, INC., Burbank, CA (US)

(72) Inventors: James Alexander Stark, South Pasadena, CA (US); Clifford Wong, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 89 days.

(21) Appl. No.: 13/951,200

(22) Filed: Jul. 25, 2013

(65) Prior Publication Data
US 2015/0032295 A1  Jan. 29, 2015

(51) Int. Cl.
*B64C 19/00* (2006.01)
*B64C 39/02* (2006.01)
*G05D 1/10* (2006.01)
*G06T 7/00* (2006.01)

(52) U.S. Cl.
CPC ............... *B64C 19/00* (2013.01); *B64C 39/02* (2013.01); *G05D 1/101* (2013.01); *G06T 7/004* (2013.01)

(58) Field of Classification Search
CPC .................... B64C 19/00; B64C 39/02
USPC ........................................................ 701/3
See application file for complete search history.

(56) References Cited

PUBLICATIONS

Lamberti et al, Mixed Maker-Based/Marker-Less Visual Odemetry System for Mobile Robots, Apr. 22, 2013, Int JADV Robotivsy, 2013, vol. 10, 260:2013.*
Masselli et al, A Novel Marker Nased Tracking Method for Position and Attitude Control of MAVs, 2012 http://www.cogsys.cs.uni-tuebingen.de/publikationen/2012/Masselli2012IMAV.pdf.*

* cited by examiner

*Primary Examiner* — Fadey Jabr
*Assistant Examiner* — Yazan A Soofi
(74) *Attorney, Agent, or Firm* — Marsh Fischmann & Breyfogle LLP; Kent A. Lembke

(57) ABSTRACT

A method for locating markers in an image captured by a mobile device moving about an operating space. The method includes preprocessing an image to generate a set of image data, locating fixed features of markers by tracing edges of the fixed features, and extracting variable data payloads of each of the markers associated with the located fixed features. The fixed features of each of the markers may include a pair of parallel lines extending along opposite sides of a data area containing the variable data payload, and each of the lines extends a distance beyond each exposed end of the data area to avoid missing data when markers are not arranged orthogonally to the scan direction. The preprocessing involves rotating or skewing the image to provide rotated or skewed versions of the image to facilitate locating markers regardless of their angular orientation in the image.

19 Claims, 21 Drawing Sheets

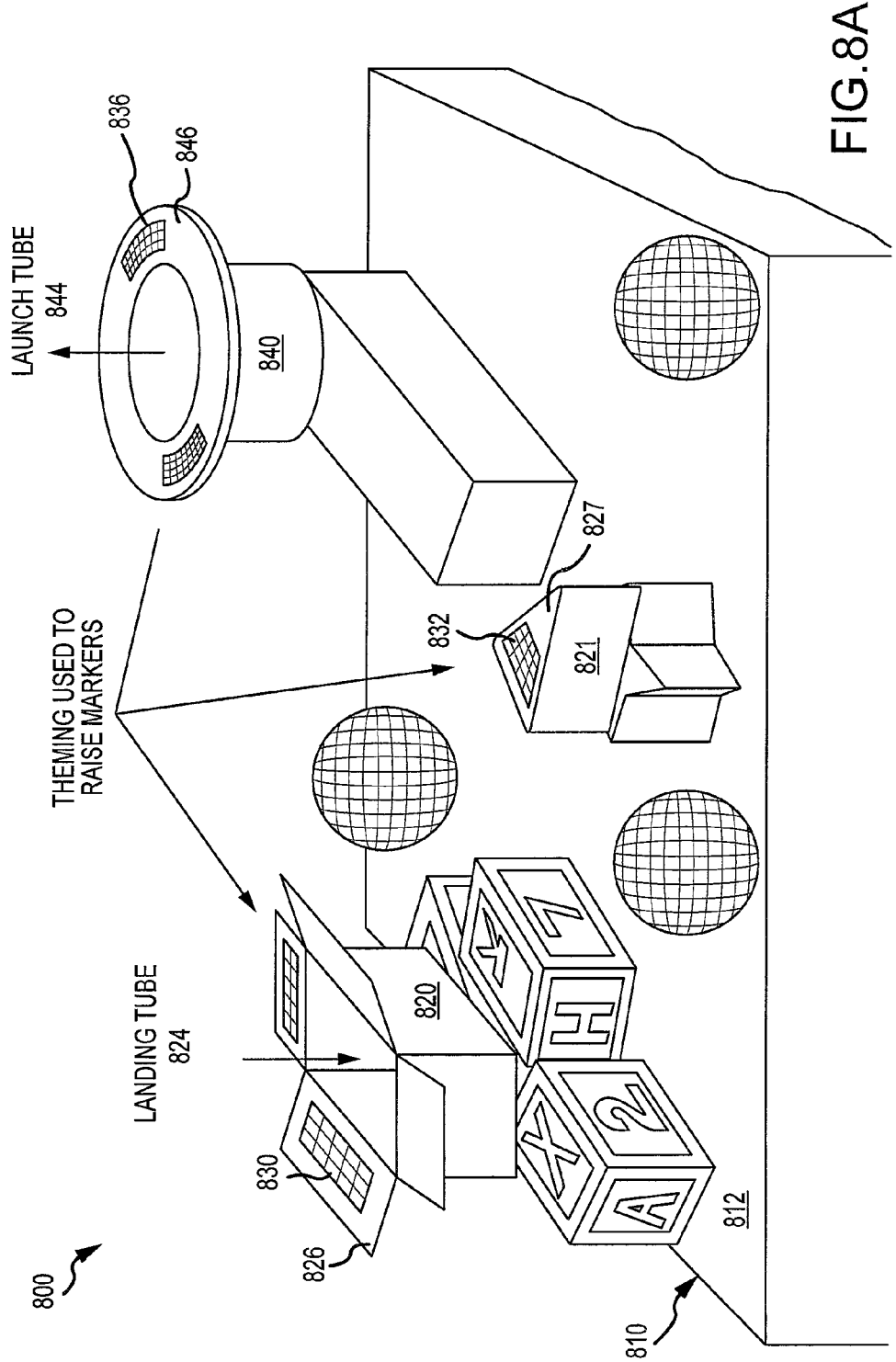

VISUAL LOCALIZATION OF UNMANNED AERIAL VEHICLES BASED ON MARKER DETECTION AND PROCESSING

BACKGROUND

1. Field of the Description

The present description relates, in general, to methods and systems for providing localization or a three-dimensional coordinate in a space for an object, and, more particularly, to methods and systems for providing localization or existing spatial positions (or absolute positions) for an object in a space such as for use in accurately controlling movement of an unmanned aerial vehicle (UAV) as it flies within a space to perform a task or a land vehicle or other mobile device as it moves in a space, e.g., move UAVs in an aerial display or entertainment setting relative to set pieces and props and relative to other UAVs in the same space.

2. Relevant Background.

There is a growing interest in utilizing unmanned aerial vehicles (UAVs) such as remotely controlled drones/airplanes, helicopters, and multicopters to perform a wide variety of tasks. An exemplary UAV that is receiving growing attention is the multirotor or multicopter. This UAV is a rotorcraft with more than two rotors, and multicopters often use fixed-pitch blades with control of vehicle motion being achieved by varying the relative speed of each rotor to change the thrust and torque produced by each rotor. Multicopters may also be named quadcopters, hexacopters, and octocopters to refer to their number of rotors (e.g., 4, 6, or 8, respectively).

Due to their ease of both construction and control, multirotor aircraft are frequently used in model and radio control aircraft projects such as to provide a lower budget option for creating aerial displays (e.g., for entertainment) or for collecting aerial videos. In these implementations, the UAVs may carry a payload, such as lights, props, and/or one or more cameras, and be remotely controlled to move over a targeted object or geographical area. Electronically controlled multicopters may be powered using a battery driving brushless motors and propellers with control provided with an onboard flight controller/stabilization board selectively throttling the motors in response to control signals and that may be in communication with an operator (e.g., on the ground) using a radio controller unit. In other implementations, mobile objects such as remotely controlled land vehicles or robots may be used to perform a particular task in a space.

An ongoing challenge, though, is how to better control the UAVs and other mobile devices (e.g., mobile land or air vehicles) for particular uses or while performing differing tasks. For example, control over a mobile vehicle may require that an absolute position (or localization data) be determined for the mobile device within a space. However, it has proven problematic for a number of reasons to obtain such position information for mobile devices using onboard or off-board systems. First, localization needs to be done fast especially when the position location in the space is used for controlling the vehicle in real time. Second, with regard to onboard systems, the systems used to perform the localization often need to be very lightweight such as when they are provided on an aerial vehicle or other mobile device with a limited payload capacity. Third, again with regard to onboard systems, the localization systems need to be designed to consume relatively low amounts of power so as not to drain an onboard battery. Fourth, localization processes preferably are robust with regard to interference, distortion of observations, and system degradation (e.g., such as dirt on the mobile device or on a marker or other feature used in the localization or operating in a sensor shadow).

Off-board systems that are designed to locate a mobile device in a space typically do not have the same power and weight constraints. However, off-board systems are not useful in many applications. Particularly, onboard localization is often preferred to avoid the communications delay that occurs with off-board systems between ground (or off-board) devices and the mobile device. Further, communications between a mobile device and a remote/off-board localization system may be lost, and this would result in an unacceptable loss of localization services needed for proper control (which may force a mobile device to pause operations until communications are restored or force landing (or at least a period of hovering) for a flying vehicle).

Hence, there remains a need for methods and systems for providing localization for mobile devices such as UAVs flying within an air space or land vehicles/robot over some platform or terrain. Preferably, such localization methods and systems would provide absolute position data in a quick and efficient manner useful in real time control of movements of a mobile device.

SUMMARY

Briefly, a localization system (and corresponding method) is described that includes an onboard sensor(s) on a mobile vehicle, such as an unmanned aerial vehicle (UAV), that can collect visual data (provide a digital image stream). The localization system further includes a plurality of localization markers placed at predefined locations or on predefined objects within a space in which the mobile vehicle moves during performance of a task. The localization system further includes one or more modules operable (such as by a processor executing computer readable code or programs in onboard memory) to process the image stream to identify localization markers, to process data provided by such identified markers, and to use the marker data to determine an absolute position of the mobile vehicle (e.g., 3D coordinates relative to a set of localization markers such as three such markers to allow triangulation).

As part of providing the localization system, the inventors recognized that is would be beneficial to redesign or, more accurately, to provide new designs for markers that may be installed within a mobile device's travel space. In some embodiments, the installed localization markers provide a fixed pattern that can be found using a single scan direction. Markers may be provided that include a fixed pattern that distinguish the marker from other objects in the environment (identify it as a marker) and also include a variable data area. The contrast between the described techniques and past processes has to do largely with better use of information. In other words, the described techniques retain more information than in simple thresholding, and, more significantly, the techniques described do a better job of following straight or relatively straight ("straightish") lines. If there is bad noise, such as a blotch or salt-and-pepper noise, then part of an edge could potentially be missed, but the techniques or algorithms described are configured to better bridge a gap in the middle of a linear edge.

One concept behind the pattern design for the localization markers is to provide all stripes or borders for each marker such that they can be detectable in the same sweep or scan (e.g., if provide two borders make sure both can be detected in a single sweep even if the marker is placed at an angle or non-orthogonally within an image of the mobile device's travel space). In practice, markers may be present in the image, obtained by an onboard sensor/camera, at a range of angles. One marker design addresses this issue by extending the fixed pattern (e.g., borders) so that detection of the marker will work across the whole variable data area for all angles (e.g., extend borders/stripes out beyond the variable data area (e.g., the length of the borders/stripes of the fixed pattern is greater by some amount (e.g., 20 to 40 percent or more) than the variable data area and is arranged to extend out on both ends from the data area). The subroutine or module (or algorithm) of the localization program that detects or identifies a marker in an image may use multiple passes in order to maximize the information in the image as it, for example, traces edges.

More particularly, a marker (or "localization marker") is provided that is adapted for efficient location in an image using one-directional scan. The marker includes a body with an exposed surface (e.g., a planar piece of paper or plastic with adhesive on the other side for attaching the body to objects in a travel or operating space of a mobile device). The marker then includes a marker pattern provided on the exposed surface, the marker pattern including: a fixed pattern; and a data area with a variable pattern. The fixed pattern includes a two or more parallel, linear features that are spaced apart a predefined distance. Further, the data area is sandwiched between the set of linear features, and each of the linear features has a length greater than a maximum length of components of the variable pattern.

In some implementations, the linear features are elongated bars with a width of at least 1 pixel. In these or other implementations of the markers, the length of the linear features is at least 20 percent greater than the maximum width of the components. In such cases, each of the linear features may be positioned on the exposed surface to extend a distance beyond opposite ends of the components of the variable pattern (e.g., such that the data area is not "missed" in a horizontal scan even when the marker is not arranged in a vertical orientation in the image).

To provide an enhanced localization marker, the components of the data area are positioned at predefined offsets from inner edges of the pair of the linear features. Particularly, the components of the variable pattern may be lines of dots extending parallel to each other and to the linear features, and each of the lines of dots can then be positioned at one of the predefined offsets from the inner edges of the pair of the linear features (e.g., for ready location during extraction of a data payload from the marker). The fixed pattern may further include second and third pairs of linear features. In such cases, the linear features extend parallel to the pair of linear features outside of the data area, and, on each side of the data area, adjacent ones of the linear features are spaced apart a second predefined distance of at least about 1 pixel. Further, in some cases, each of the linear features of the fixed pattern has an equal length greater than the maximum length of the components of the variable pattern.

BRIEF DESCRIPTION OF THE DRAWINGS

FIGS. 8A and 8B are side and top views of an exemplary stage (e.g., parade float) that may be used to provide launching and landing tubes;

DETAILED DESCRIPTION

Figure 1:
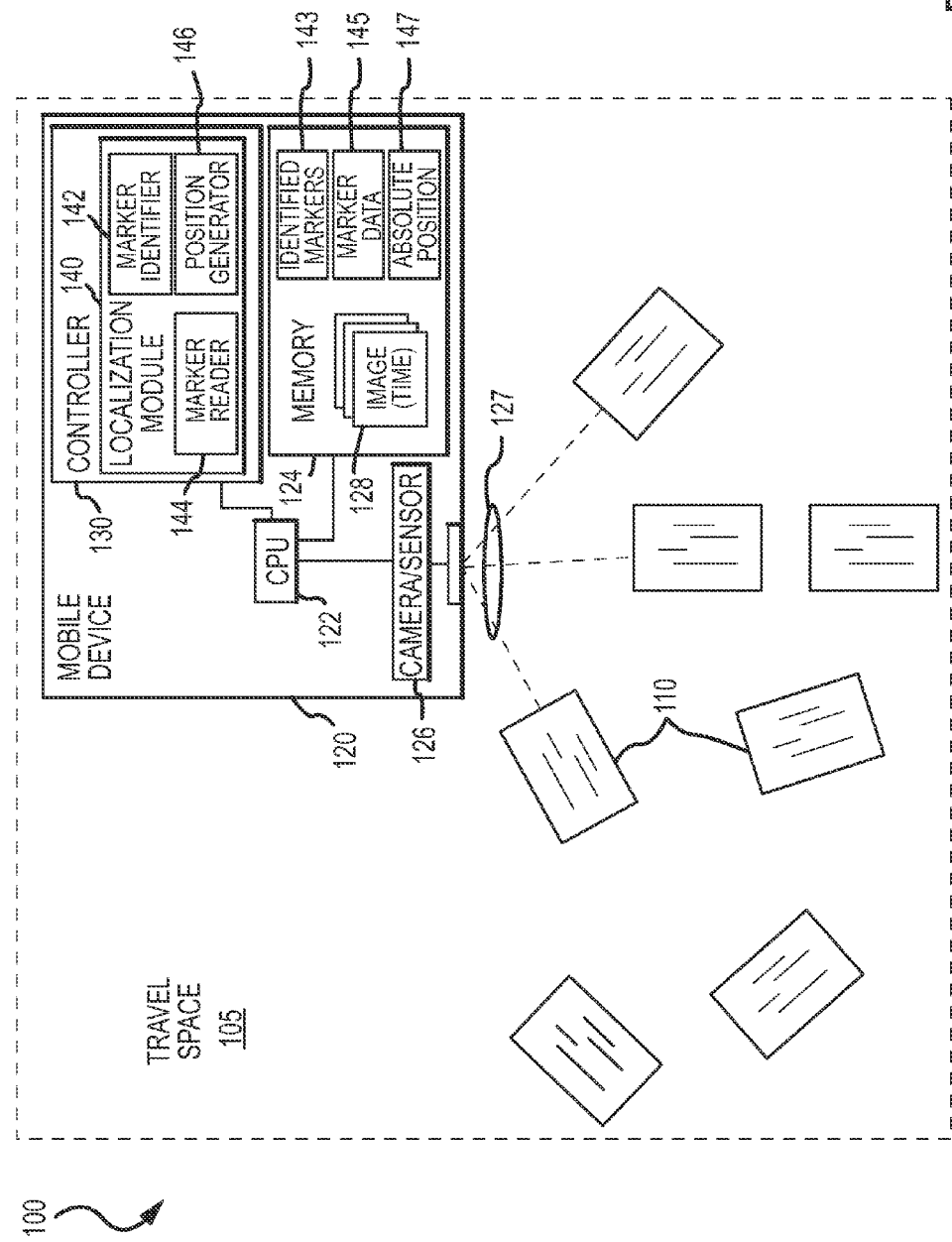
FIG. 1 illustrates a functional block diagram of a localization system including a mobile device adapted for performing onboard localization using markers in a mobile device travel space.

The present description is directed toward methods and systems for determining a location of a mobile device within a space or volume in which the mobile device is traveling (mobile device travel space or volume). Such "localization" of the mobile device is achieved using localization markers having a new design or combination of a fixed pattern and a variable data area that is adapted for better detection in a single scan direction regardless of the orientation of the marker in the processed image.

The localization system includes a controller on a mobile device, and the controller includes a processor and memory acting to run a localization module. A sensor or camera is provided on the mobile device for capturing image data from the mobile device travel space, and the localization module acts to process this image data (e.g., with scans in a particular direction) to identify markers in the image, to process the identified markers including reading the variable data area, and to determine an absolute position for the mobile device in the space (e.g., to provide localization for the mobile device). The absolute position can then be used by the controller to direct its movements within the travel space such as relative to the marked objects.

Prior to turning to specific implementations of localization methods and systems, it may be useful to discuss previous approaches and improvements provided the inventors' ideas. The localization system and method described provides a significant departure and enhancement over any prior visual marker or object detection approach to determining mobile device positions. Most existing systems require too much power and are too heavy or use in small air vehicles such as typically unmanned aerial vehicles (UAVs). Global position satellite (GPS) systems suffer from problems with robustness, availability, and high latency. Some prior marker detection systems used for localization are very effective, but such systems are heavy and rely upon expensive and custom FPGA (field-programmable gate array) implementations.

Generally, previous marker systems were only light enough and fast enough if they were designed to reduce the data being processed very early such as by applying a global threshold within the first few processing stages. This, however, significantly reduces the robustness of the marker detection since, for example, interference degrades the data. The early data reduction effectively throws away or discards useful information. In contrast, the methods and systems described herein retain useful information from the image and potential markers until later stages of the marker identification process. The methods and systems described also limit the use and impact of global parameter settings. With current technology, the existing marker systems can achieve rates approaching 30 frames per second, but this is barely acceptable speed for many applications especially when it is remembered that such systems suffer from robustness problems.

Existing marker detection systems also have limited prospects for parallelization. The main prospect or approach is through the use of tiling of the image, e.g., dividing up portions for separate processing. Moreover, part of the memory access in such systems is necessarily 2D, which makes the algorithms dependent upon memory fetches from dispersed locations, which are slower than processor speeds (and do not speed up in the same way with improvements in technology). In contrast, this description teaches systems and methods that use sequences of line scans and caching a few previous lines. Hence, most image data access is sequential and localized. Furthermore, the methods and systems described can be implemented with less decision-dependent branching in the code, which improves processor pipeline efficiency and the potential for parallelization. In addition to improving the use of information and the patterns of memory access, the methods and systems described are more suitable for mobile FPGA implementation and can provide better sub-pixel precision of marker positions.

The following description describes a system and methods/techniques for finding a new type of localization marker (or simply "marker") within images. The identified markers allow a mobile device/object, such as an aerial vehicle, to estimate its location and also pose using one or more cameras. FIG. 1 illustrates, with a functional block diagram, a localization system 100 in which a plurality of markers 110 have been positioned in a space 105 (e.g., on a plurality of objects (not shown) such that the markers 110 are each at predefined locations within the space 105).

The system 100 further includes at least one mobile device 120 such as a robot, a land vehicle, or, as used in many examples herein, a UAV or the like. The mobile device 120 is adapted for onboard determination of its absolute position in the travel space 105 (e.g., for performing localization). To this end, the mobile device 120 includes a processor 122 that manages operation of various components on the mobile device 120 such as memory/data storage 124 and a camera/sensor 126. Further, the processor 122 may execute instructions, code, or executable programs to perform a variety of control and other functions including localization. To this end, the processor 120 may execute code that causes it to provide a controller (perform control functions) 130 that include moving the device 120 about the space 105 based on its absolute position 147.

The controller (or this set of software) 130 may include a localization module 140 with a number of routines such as a marker identifier 142, a marker reader 144, and a position generator or determination mechanism 146. During operation, the camera/sensor 126 is operated to capture a plurality of images 128 that may be buffered or stored in memory 124 for processing by the localization module 140. Particularly, the images 128 may be frames of a video stream captured 127 by the camera 126 and images of a number of markers 110 in the space 105 are included in the images 128. The marker identifier (e.g., that may include the algorithms described herein) 142 acts to process the images 128 to identify the markers 110 with corresponding data related to the identified markers 143 stored in memory 124.

The identified markers/marker data 143 is then processed by the marker reader/processor 144 to obtain marker data 145 such as from the variable data area of each marker 110 that provides a unique identifier of each marker 110 that can be used to determine the location of the markers 110 (or marker position/location in the space 105 may be determined in other ways). The position generator/estimator 146 then uses the marker data 145 to determine or estimate an absolute position or 3D coordinates along with pose of the mobile device 120 within the space 105 as shown at 147. This estimated position 147 in space 105 can then be used by the controller 130 to maneuver the mobile device 120, such as via a predefined trajectory or flight plan or in a real time, responsive manner to avoid or interact with objects associated with the markers 110 or otherwise positioned in the space 105.

A preliminary or first stage of the process of localization using system 100 involves locating the markers 110 with the marker identifier 142 as shown at 143, and these markers are identified such as by the module 144 reading the data from the variable data area (e.g., to determined IDs of markers 110. The results 145 from multiple markers (e.g., at least 3 markers 110 are typically required to allow the position generator 146 to determine the absolute position 147 of the mobile device 120 in the space 105. Knowledge of the location of a single marker 110 provides the localization module with partial information on the location and also the pose of the mobile device 120 (e.g., of the camera 126 of the mobile device 120). When such location information is known for at least two more of the markers 110, the position generator/determination module 146 can accurately determine the absolute position and pose 147 of the mobile device 120 (or its camera 126) (e.g., each marker 110 provides a portion of the information required to estimate location and pose).

Localization (estimated position 147, for example) that is based on visual markers, such as markers 110 of system 100, may be combined with other information that may be faster (position estimated with less latency) or slower, may be more or less accurate, and may be more or less robust. One attractive option is to further include inertial measurement units (IMUs) on the mobile device 120 as such IMUs can quickly produce estimates (but may be subject to drift).

Figure 2:
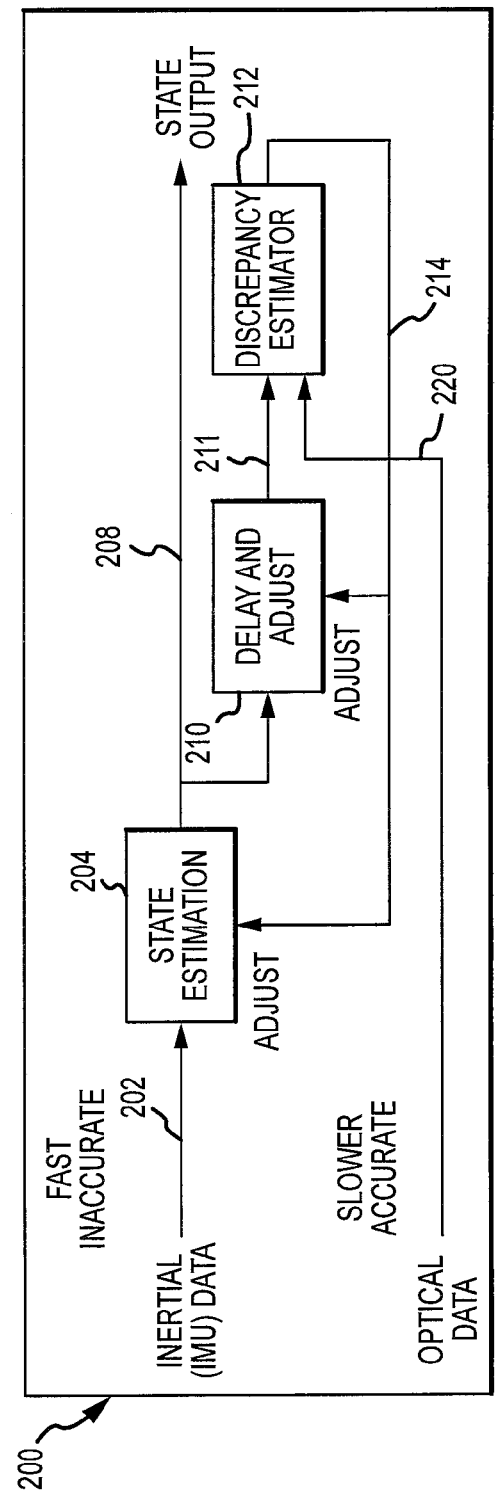
FIG. 2 is a functional block diagram of a method of generating estimates of a state (position and pose) of a mobile device by combining inertial-based estimates with marker-based estimates of state.

For example, FIG. 2 illustrates a method 200 that can be carried out by the position generator 146 to generate the estimated position 147 for use in controlling movement and/or positioning of the mobile device 120. In the method 200, the state estimation for a mobile device generated from marker locations 220 may be fused with other data by a discrepancy estimator 212. In the method 200, IMU or inertial data 202, which is fast and inaccurate and often less robust, regarding pose/location is provided to state estimator 204 that provides an estimated state or state output 208. A delay and adjust step 210 may be performed with its output 211 provided to a discrepancy estimator 212 along with the pose estimate based on optical data (markers) at 220, which is slower to create but is more accurate. The location estimates 220 from markers are used in method 200 to remove drift from state output 208 based on IMU data 202. The discrepancy 214 between the marker estimate 220 and the IMU-based estimate 208 is used to improve the estimate of the state (which is the location and pose) of a mobile device. Since the location estimates generated by the markers is delayed (or slower than the IMU data 202), it may be useful to delay the IMU estimate as shown at 210 and, while the delay is being applied, account for any adjustments made in the intervening period.

The inventors recognized that there is a close linkage between the design of the form of the markers and the algorithm/processing methods used to locate the markers in an image (optical data). Quite a variety of marker forms have been used in the past, and a major consideration is the circumstances in which each of these prior markers were used (e.g., what operating environments these markers were designed to be used within?). Over time, attention has been devoted to markers that are invariant to specific kinds of distortion so as to suit particular operating environments. Another major consideration or driving force in marker design has been the availability of software implementations (e.g., what software is readily available and what marker design is it suited for processing?). The general form of a marker is a fixed pattern such as a square or a circle and a variable data area, with the fixed pattern being intended to be almost unmistakable and quickly identifiable using machine vision techniques.

In contrast, driving forces that have led to the presently described marker design include: (a) relatively small data payloads; (b) robustness to corruption by noise (rather than, for example, lens distortion); and (c) low latency in processing the markers (identification and reading of data from a variable data area). With this in mind, a new form or design for a localization marker is presented in the following description. As will become clear, the localization marker is configured such that most of the image analysis can proceed with line-by-line scanning, thereby improving locality of reference. In some cases, multiple marker scans can be combined. The marker designs also permit analysis that retains more information for longer periods of time, which improves precision (through sub-pixel information) and avoids information loss as was a problem with use of simple thresholding.

Another design consideration for localization markers and position determination is calibration. The environment and camera set-up typically are measured and analyzed so that the locations of the markers within images of a travel space can readily be converted to location and pose information of the cameras and mobile devices carrying such cameras. This is rather like an inversion of the classical motion capture calibration. In the present case, the camera is moved relative to markers with known and unknown location. Those with known locations establish the coordinate reference frame and are used to estimate the camera positions during calibration. Using views from multiple angles, the positions of other markers are estimated.

To expand on this point, calibration of a classical motion capture system involves placing a set of markers with a known pattern at specific locations with a specific orientation. This may be done with a wand that has liquid levels on it, for example. The location of this set of markers defines the coordinate origin. Once the origin is established, a wand is waved throughout the volume in order to calibrate the exact relative position of the cameras. This wand may be the same as the pattern that is used to establish the origin. With regard to calibration of installed marker positions, a camera may be moved around the operating or mobile device travel space, with varying poses as well as locations. Some of the markers are installed at known locations. Calibration begins with the known-location markers that are visible to the camera. Then, the camera is moved so that more markers, some with unknown locations, come into view (and their images are captured by the camera). The markers of known location are used to establish the camera position in the operating space, and, then, from multiple known camera positions in the operating space, the locations of other markers can be established such that all markers are then in known locations in the operating space.

Figure 3:
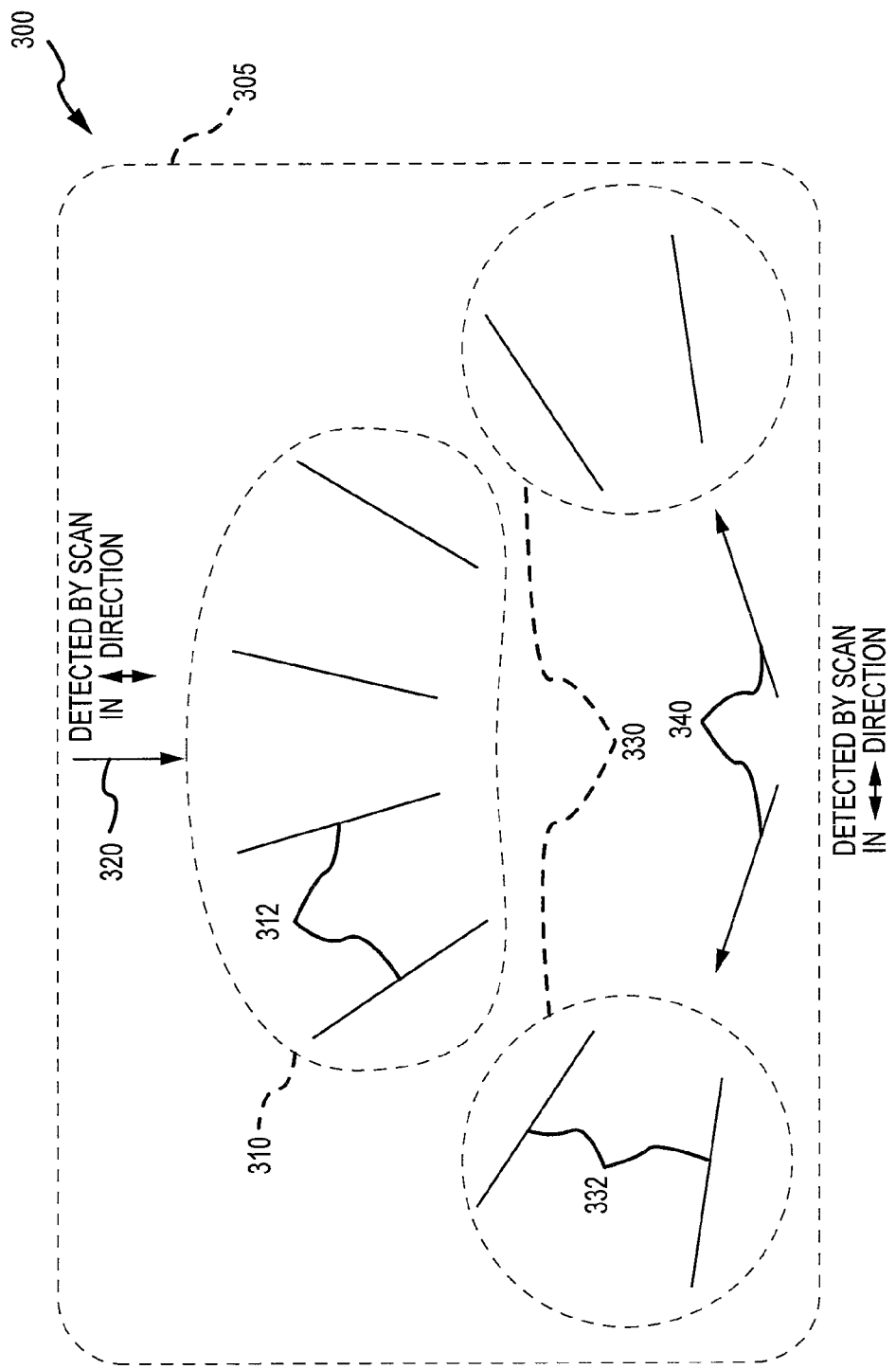
FIG. 3 is a schematic of scanning of an image being performed to identify linear features such as bars or lines provided in a localization marker.

FIG. 3 illustrates schematically processing 300 of an image 305 (e.g., of an operating or travel space) to identify markers or, more accurately, linear features (e.g., lines of some minimal thickness or bars). For example, lines or bars may be useful in the fixed pattern of a marker (such as to provide a border adjacent or about a variable data area). FIG. 3 is useful for showing that in an image 305 (such as an image captured by a mobile device of a space containing multiple localization markers), linear features such as lines or bars may be presented with differing orientations. In area 310 of image 305, a first set of linear features 312 are arranged to be substantially vertical (relative to a vertical axis (not shown) extending through the image 305), e.g., within about 45 degrees of vertical. In areas 330 of image 305, a second set of linear features 332 are arranged differently so as to be substantially horizontal (relative to a horizontal axis (not shown) extending through the image 305), e.g., within about 45 degrees of horizontal.

During marker identification processes, linear features 312, 332 at different angles are typically only detected with scans in approximately the same (overall) direction, such a scan direction that is within 45 degrees of being parallel. For example, vertical scanning (or scanning with a first direction corresponding (within about 45 degrees) to the arrangement of bars 312) 320 is useful for detecting the substantially vertical linear features or bars 312 while horizontal scanning (or scanning in a second direction corresponding to the arrangement of bars 332) is useful for detecting the substantially horizontal linear features or bars 332. But, the scanning 320 may not detect the bars 332, and the scanning 340 may not detect the bars 312.

Figure 4:
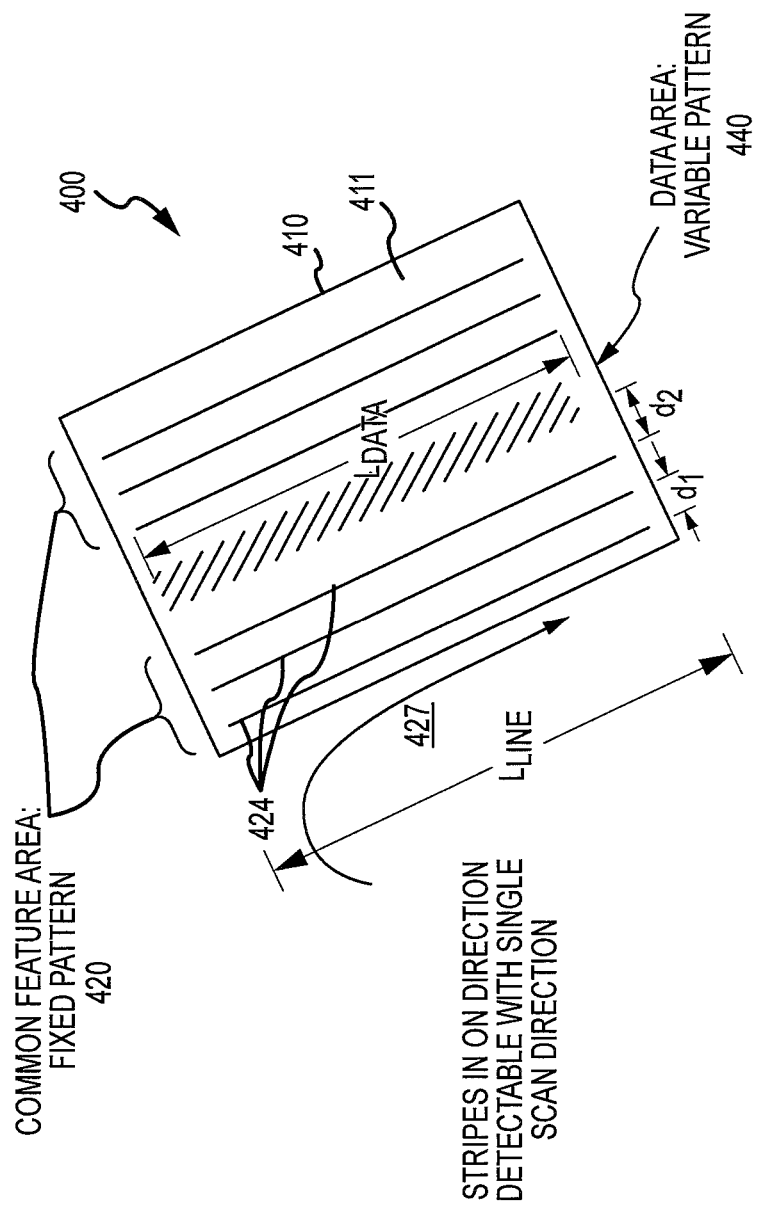
FIG. 4 illustrates one embodiment or design for a localization marker according to the present description.

FIG. 4 illustrates one embodiment or design for a localization marker 400 according to the present description. The marker 400 includes a body 410 with an upper or exposed surface 411, and the body 410 may be planar and have adhesive on the side opposite the side/surface 411 for use in affixing it to an object in an operating space for a mobile device. The marker 400 includes a pattern made up of a fixed pattern 420 and a variable data area (e.g., a variable pattern providing differing readable data such as an ID for the tag 400) 440. The fixed pattern 420 is a common feature area that may be provided on each marker 400 to allow ready recognition of the marker 400 in an image as a localization marker.

Particularly, the fixed pattern or features 420 are configured such that the marker 410 can be detected with a single scan. In the shown marker 400, the fixed pattern 420 includes one or more stripes, lines, or bars (e.g., linear features) 424. More particularly, the fixed pattern 420 preferably includes two or more stripes 424 that are spaced apart a predefined distance, $d_1$ (distance known by marker identifier to facilitate eliminating false positives with linear features having differing separation distances between linear features) and that are also parallel to each other. The arrangement of the linear features in a single or in one direction on the body's surface 411 makes the marker 400 detectable using a single scan direction as shown with arrow 427.

In the particular embodiment shown in FIG. 4, the fixed pattern 420 includes three parallel lines 424 on opposite sides of the data area 440 such that variable pattern or readable data of the marker 400 is sandwiched between the fixed pattern elements 424. With the linear features 424 located on the surface 411, the location of the variable pattern or data area 440 can be determined as the edge of the data area 440 relative to the inner pair of lines/linear features 424 is predefined/known as $d_2$ or the location of the variable pattern 440 may be set as a center point between the inner pair of lines 424. In the marker 400, the stripes or lines 424 of the fixed pattern has a length, $L_{Line}$, that is equal to the length, $L_{Data}$, of the variable pattern 440.

Figure 5:
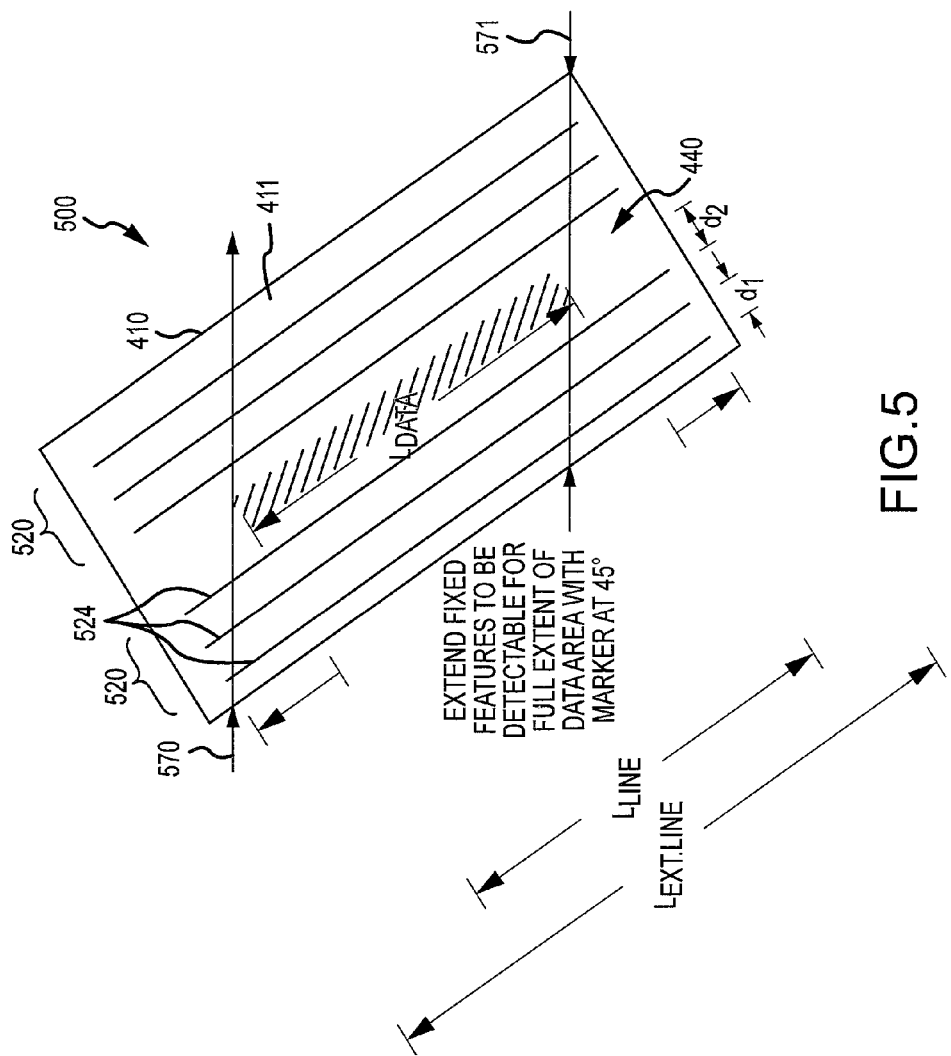
FIG. 5 illustrates another embodiment or design for a localization marker similar to the marker of FIG. 4 but with the lines or stripes of the fixed pattern extending out a distance from each end of the variable pattern or data area of the marker.

FIG. 5 illustrates another embodiment of a localization marker 500 that may be used by a mobile device during localization. The marker 500 includes a number of the components of marker 400 of FIG. 4 and such similar features are labeled with like numbers in FIG. 5 (and not discussed in detail here). In the embodiment or design of localization marker 500, the lines or stripes 524 of the fixed pattern 520 each extend out a distance from each end of the variable pattern or data area 440 of the marker 500. In other words, the length, $L_{Line}$, of the lines 424 has been extended to a new length, $L_{Extended\,Line}$, that is greater than the data area length, $L_{Data}$ (or proportion of the width). The lines 524 are also positioned such that it extends outward some predefined amount (e.g., at least about 20 to 30 percent of the length, $L_{Data}$, of the variable pattern 440) from each of the ends of the pattern 440.

In this manner, the extended features or lines 524 are detectable for the full extent of the data area 440 for a wide range of angular orientations of the marker within an image. For example, the overall length, $L_{Extended\,Line}$, of the lines or stripes 524 may be selected such that even when the marker 400 is arranged with the body 410 at up to 45 degrees from vertical in a space a scan from any direction will be able to identify linear features 524 prior to hitting data area 440, which reduces the risk that data will be missed. For example, horizontal scans 570, 571 from either direction strike and, hence, allow detection of lines/stripes 524 prior to passing into the data area 440, but, if extension had not occurred for lines 524, the scans 570, 571 with the marker at 45 degrees from vertical (and horizontal) would pass over the data area 440 prior to finding a line in the fixed pattern.

Figure 6:
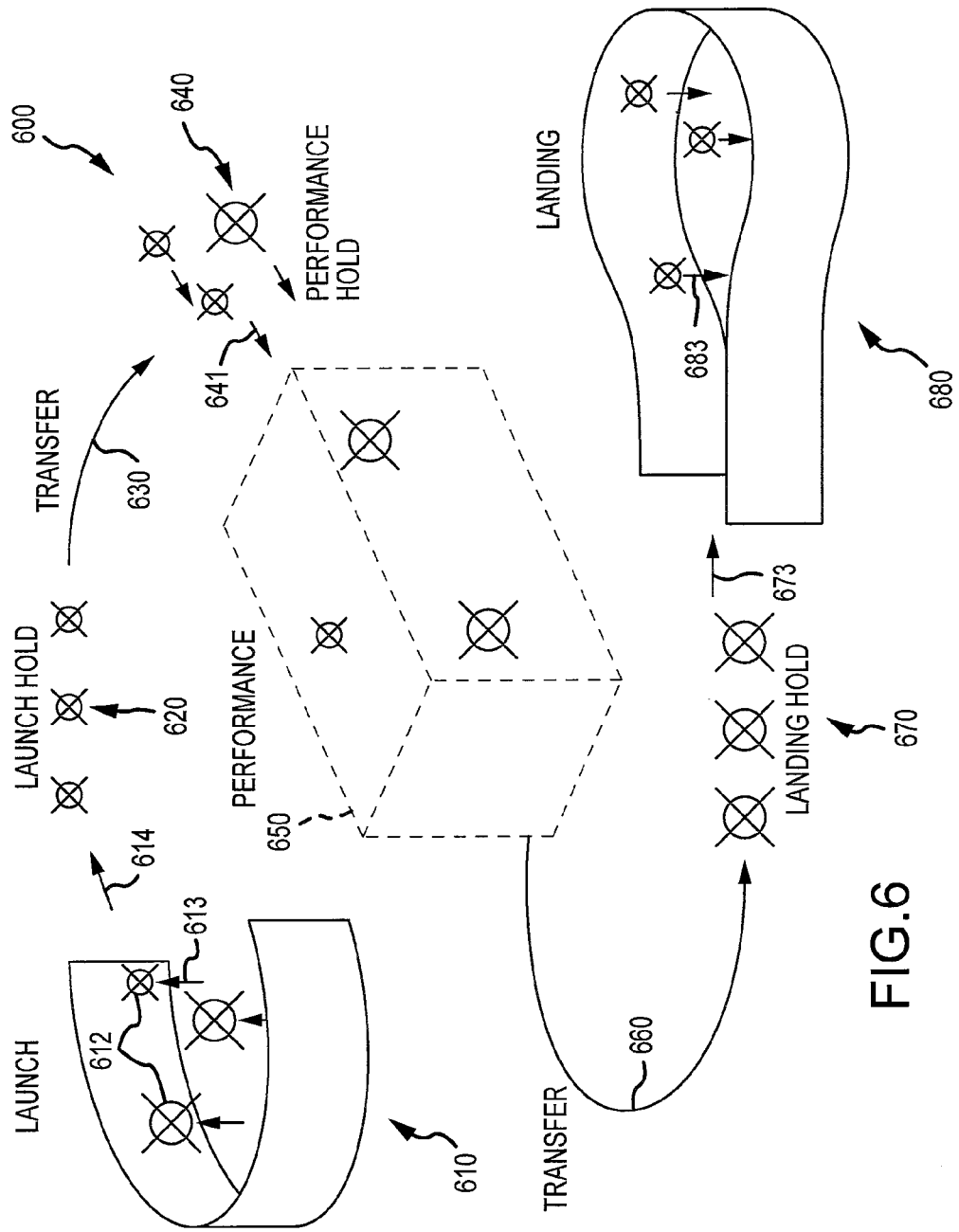
FIGS. 6 and 7 provide functional block or schematic drawings use of UAVs in a performance setting showing importance of accurate position determination for use in controlling movement of UAVs during a task such as a show performance.

At this point in the description, it may be useful to present use cases or exemplary applications where localization markers and the processes for identifying and reading such markers in an image may be useful and beneficial. UAVs or other flying vehicles may be used in an entertainment setting such as in a show performance to entertain an audience. Any such performance by flying vehicles can be broken down into a succession of stages as shown in the UAV-based entertainment system 600 of FIG. 6. In most, if not all, of these stages of system 600, determination of absolute position of each UAV can be used to control the UAV movements, and absolute location determination can be performed using the markers and localization processes taught herein.

In the system 600, the stages of the performance include a launch stage 610, a performance stage 650, and landing stage 680. In addition, it may be useful to incorporate holding patterns/stages 620, 640, and 670 as well as transfers 614, 630, 641, 660, and 673. One exemplary sequence of events during a performance with system 600 may be: (a) vehicles 612 are launched 613 simultaneously and stabilize in a launch area or stage 610; (b) the vehicles 612 are moved 614 to a nearby holding location 620, such movement 614 may be performed sequentially or the vehicles 612 may move out with a generous separation between other UAVs; (c) the set of UAVs 612 may travel to a viewing or performance area or stage 650 as shown including a transfer 630 of the UAVs 612, a performance hold 640, and then a movement 641 into the performance space 650; (d) in the holding patterns/areas 650, 670 the vehicles 612 may not be illuminated, and the hold pattern may be configured such that the vehicles 612 may move 641 into the performance area with illumination being on and/or such that the vehicles 612 can move 640 onto stage 650 "in character"; and (e) after the performance in space 650, the vehicles 612 move out of the viewing area 650 as shown with arrow 660 such as to a landing holding area 670 where they can be arranged for travel 673 to the landing site/stage 680 for landing as shown with arrows 683 (e.g., the vehicles 612 may be queued in landing hold 670 and the vehicle 612 may be land 683 sequentially such as with human verification of successful landing).

Regarding typical parameters, there may be, on launch, a spacing of 2 meters or the like between the UAVs or other flying vehicles. This can be reduced if the vehicles 612 are launched 613 sequentially and move 614 separately to the launch holding pattern 620. The entrance to the launch site 610 can be narrow, e.g., down to the tolerance of the onboard vehicle position estimation (which can be enhanced through the use of markers as discussed herein. The vehicles 612 typically have to maintain position estimations along transfer paths 614, 630, 641, 660, 673, but, by maintaining a greater separation between vehicles 612, the tolerance for this estimation can be relaxed to some degree. Position estimation during any pattern holding 640 immediately before performance is likely to have to be as accurate, or nearly as accurate, as that for the performance 650. This is partly because it can be difficult to transition between position estimation modes as the main performance in space 650 begins in system 600. Position estimation during landing 683 in the landing stage or space 680 is often required to be very accurate (e.g., within a few centimeters or the like) if the landing is not into a net or chute so as to avoid damaging the UAVs 612.

Figure 7:
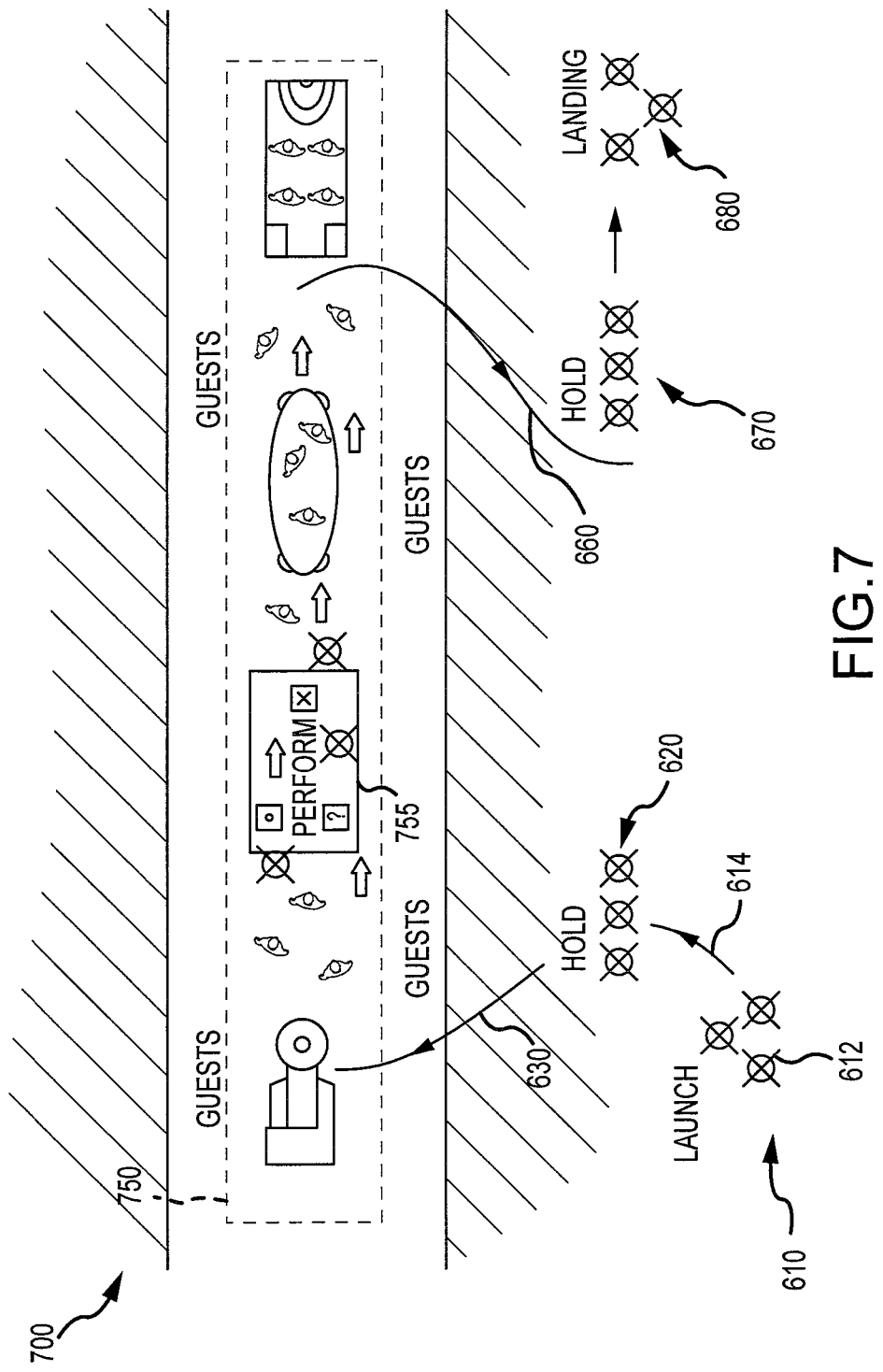

As shown in the UAV-based entertainment system 700 of FIG. 7, flying vehicles 612 may be controlled to join a parade (or moving entertainment objects) as shown by performance space 750 and its moving floats or similar components 755. The vehicles 612 may be launched 610 at a location apart (and out of sight in some cases) from the performance space 750. The vehicles 612 are then moved 614 into a launch hold space 620 and then flown/transferred 630 to join the ongoing/moving parade in space 750 such as in a street lined with guests/ audience members. Such an arrangement may be desirable as many UAV designs do not provide sufficient onboard energy storage to enable flight that lasts for an entire, and sometimes lengthy, parade with a system 700. Hence, it may be desirable to cover sections or lengths of the parade route in operating space 750 with a succession of flights with different sets of vehicles 612 that are transferred out 660, held for landing at 670, and then landed as shown at 680.

In practice with system 700, each launch site may be out of sight of parade watchers such as behind or above a nearby structure (e.g., a building). The launch holding zone may be just barely out of sight and out of hearing (such as with music playing along the parade route). The vehicles may join the parade and follow and then leave the parade in what would be a performance extended, in some cases, to include transitions. Note, many parade floats are relative tall. Therefore, the flight plan for the UAVs would also be tall or high, which may be undesirable, or the flight path followed by each UAV may have to be closely coordinated with the parade movement and float structures/objects (e.g., using markers for proper localization of the UAV). Coordination with the parade movement can include position estimation relative to at least one parade float (or item moving with the parade down the parade route). This may be achieved through markers positioned facing upward on three or more surfaces of objects carried on the float. For example, markers for localization relative to a parade float may be on surfaces (on themed objects) that are raised to heights above the range of sight of parade watchers/audience members. In some cases, the markers are incorporated into the theming so not readily noticeable by an observer. Landing typically would be out of sight, too, and most likely would be performed at a location distant from the launch site (at a point downstream from the launch site along the parade route).

Figure 8B:
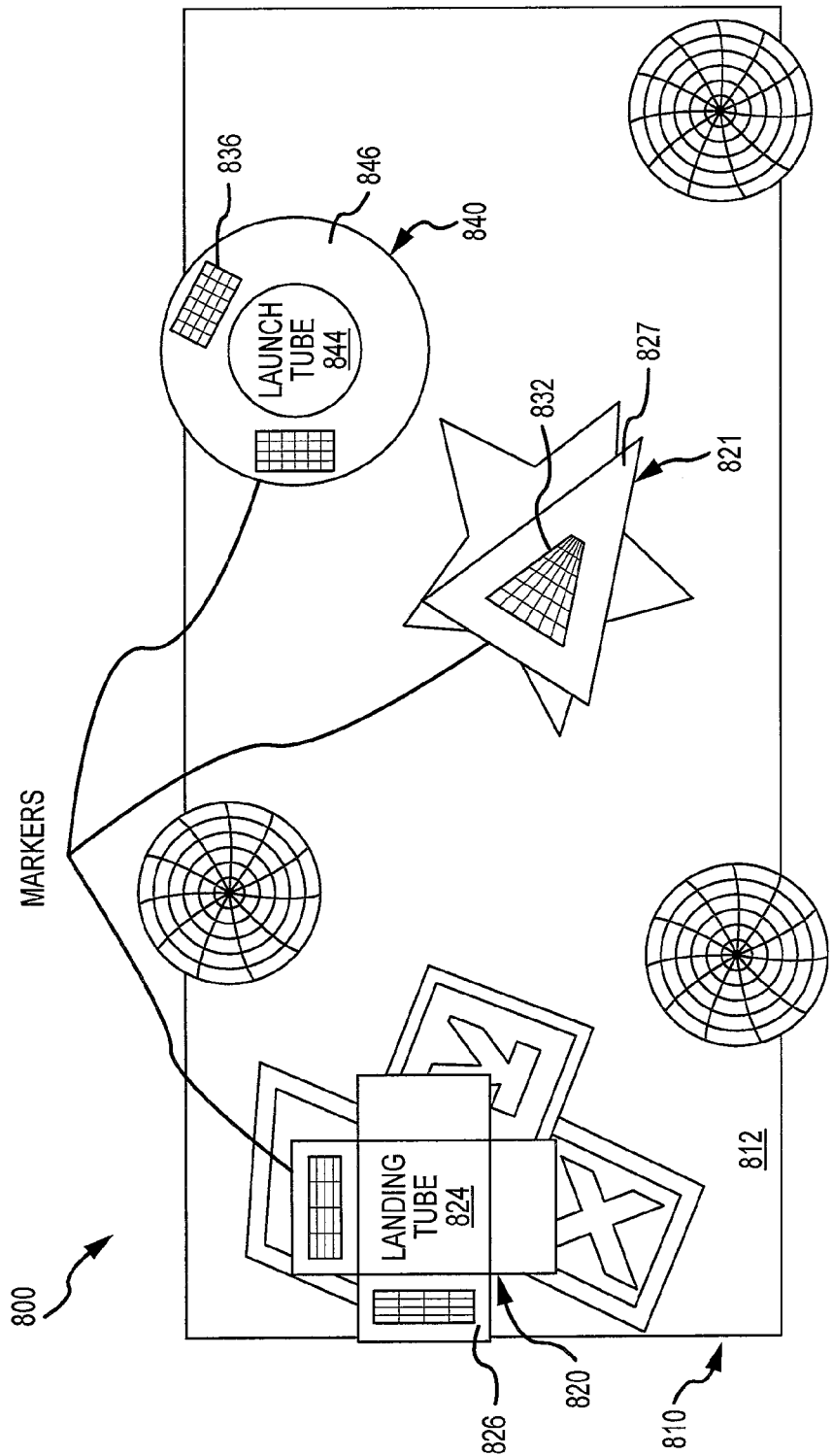

FIGS. 8A and 8B illustrate a display system 800 that is configured for launching and landing of UAVs with localization being enhanced by use of a set of localization markers. As shown, the system 800 includes a stage 810 that may be mobile (a parade float or the like). The stage 800 includes an upper support surface 812 upon which a number (e.g., at least three) props or theming objects 820, 821, 840 are positioned. Each of the objects/props 820, 821, 840 includes an upward facing surface 826, 827, 846 that would be visible to a camera/imaging sensor of a UAV hovering over the stage/float 810. A marker 830, 832, 836 is placed upon each of these surfaces 826, 827, 846 such that the marker's images can be captured in an image of the upper, support surface 812 and objects on the stage/float 810 (with localization markers provided on raised surfaces to hide them from view of casual observers of the float/stage 810). The prop/object 820 may be configured to provide a landing chute or tube 824 for UAVs while the object/prop 840 may be configured to provide a launch tube or chute 844 for the UAVs, and markers 830, 836 are used to mark the locations of these tubes 824, 844 to enable a UAV to be guided through launching and landing with knowledge of the relative positions of the markers.

The scheme taught in FIGS. 8A and 8B may be used for many performance types with a parade float (mobile platform) just being one non-limiting example. In the system 800, a platform underneath the surface 812 in float/stage 810 may be used to store vehicles and to assist in launching them from one or more tubes 844. Visual markers 830, 832, 836 combined with or provided on the theming objects 820, 821, 840 can be used to maintain accurate relative positioning of one or more UAV (e.g., relative to surfaces of the float/stage 810). A landing tube 824 that is often provided separately to the launch tube 844 may have markers 830 placed on nearby surfaces 826 (surfaces adjacent or surround an opening to tube 844) to help increase positioning accuracy during landing approach. In the system 800, the performance choreography implemented by onboard (or off-board) controllers may be used to keep the UAVs in performance away from UAVs being launched or landed in tubes 844 or 824. Separate platforms may be used for launching and landing (e.g., provide two stages/floats 810 with one used for each of these operation stages or phases). UAVs may be stored for multiple performances. For example, multiple flights may be provided along a parade route, and, in such cases, it may be useful to provide automated storage and positioning of the UAVs during landing and launching (e.g., a storage carousel that rotates to receive a next landing UAV or to move a next UAV into a launch position relative to a launch tube).

With these uses of markers and marker designs in mind, it may now be useful to describe in detail the process for locating a marker in an image (or "the marker location process"). When considering the overall design of the process, the markers are designed so that they can be readily identified with directed scans. This means that a marker oriented close to vertically in an image will be found by a typical scan, which proceeds line-by-line, top-to-bottom through an image. On the other hand, markers that are oriented away from vertical (e.g., more than 45 degrees from vertical or the like) may be difficult to find. But, it should be understood that it is not difficult to find all markers in an image. If the scan can cope with a broad range of angles, it may be sufficient to add a horizontal scan as shown in the method 900 of combining two scans shown in FIG. 9 (which may be carried out by a localization module such as module 140 of FIG. 1 or its marker identifier routine/algorithm 142). The process 900 involves flipping the image and processing is separately and then combining the results to provide an output 955 including all identified markers in the original image.

Figure 9:
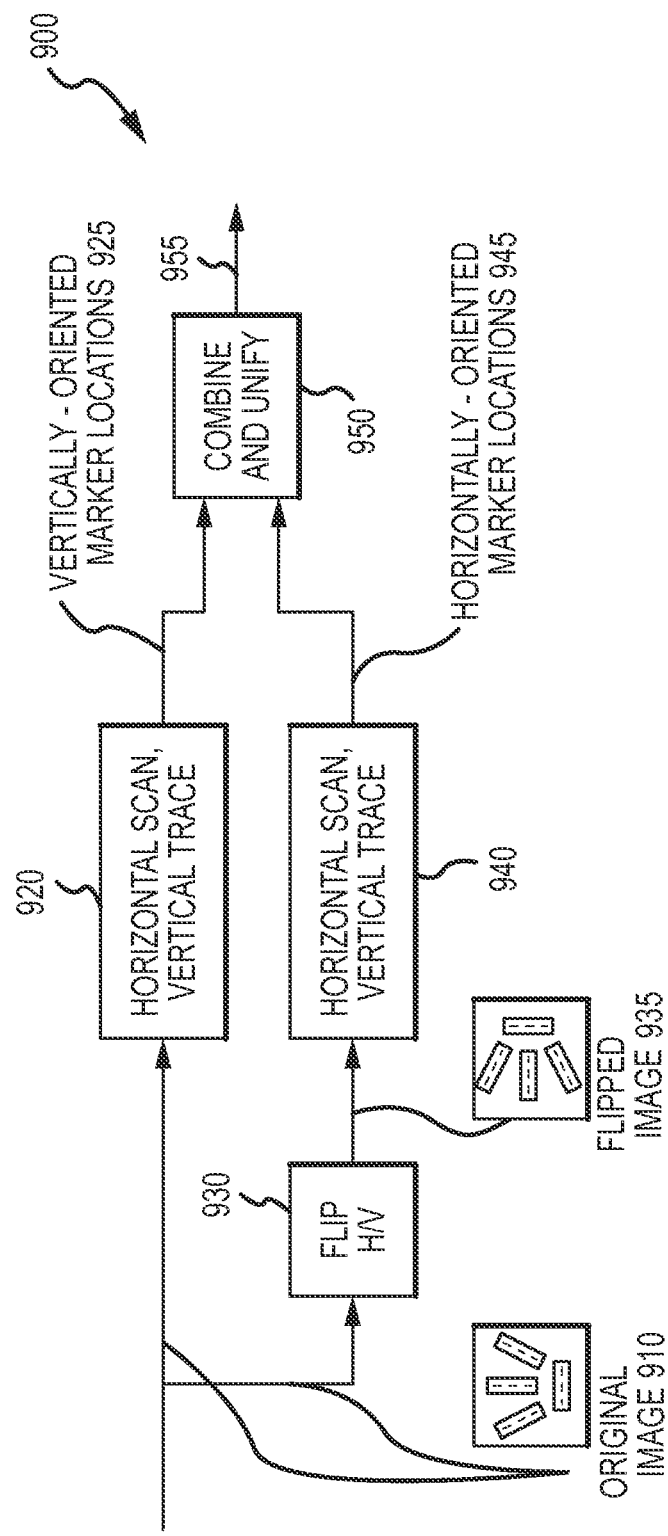
FIGS. 9 and 10 illustrate, respectfully, a 2-scan method and a 4-scan method of identifying markers or their locations in an image (e.g., an image from a camera provided onboard a mobile device such as a UAV or the like)

As shown in FIG. 9, the method 900 is adapted for identifying markers in an original image by combining two scans (e.g., two horizontal scans). To this end, the original image 910 is fed to a module 920 that performs a horizontal scan of the image with vertical trace of edges to output all vertically oriented marker locations 925 (e.g., scan across horizontally to find approximately vertical bars and then trace up and down (bi-directionally) to verify bars have been found and eliminate/reduce false positives of horizontal scan). Concurrently (or sequentially), the original image 910 is fed to a module 930 that flips the image's vertical and horizontal orientations to provide a flipped image 935 (which has been rotated 90 degrees counter-clockwise or clockwise). The flipped image 935 is run through a module 940 (similar to module 920) that acts to identify all the horizontally orient marker locations 945.

All the marker locations are fed to a module 950 that combines and unifies the marker locations and outputs a set of identified markers (or marker locations in an image 910) at 955. The markers in the image 910 are designed (as discussed above) to be scanned in one predominant direction. That is to say, the normal scan will find markers that are oriented vertically in the image 910 (or close to vertical such as 30 to 45 degrees or less from vertical). Markers that are oriented horizontally may be missed in the scan by module 920. In order to find most (if not all) markers in the image, the image 910 can be analyzed twice in process 900. If a vertical trace is applied to the flipped image 935, the module 940 will likely find markers oriented closer to horizontal (e.g., 30 to 45 degrees or less from horizontal).

Figure 10:
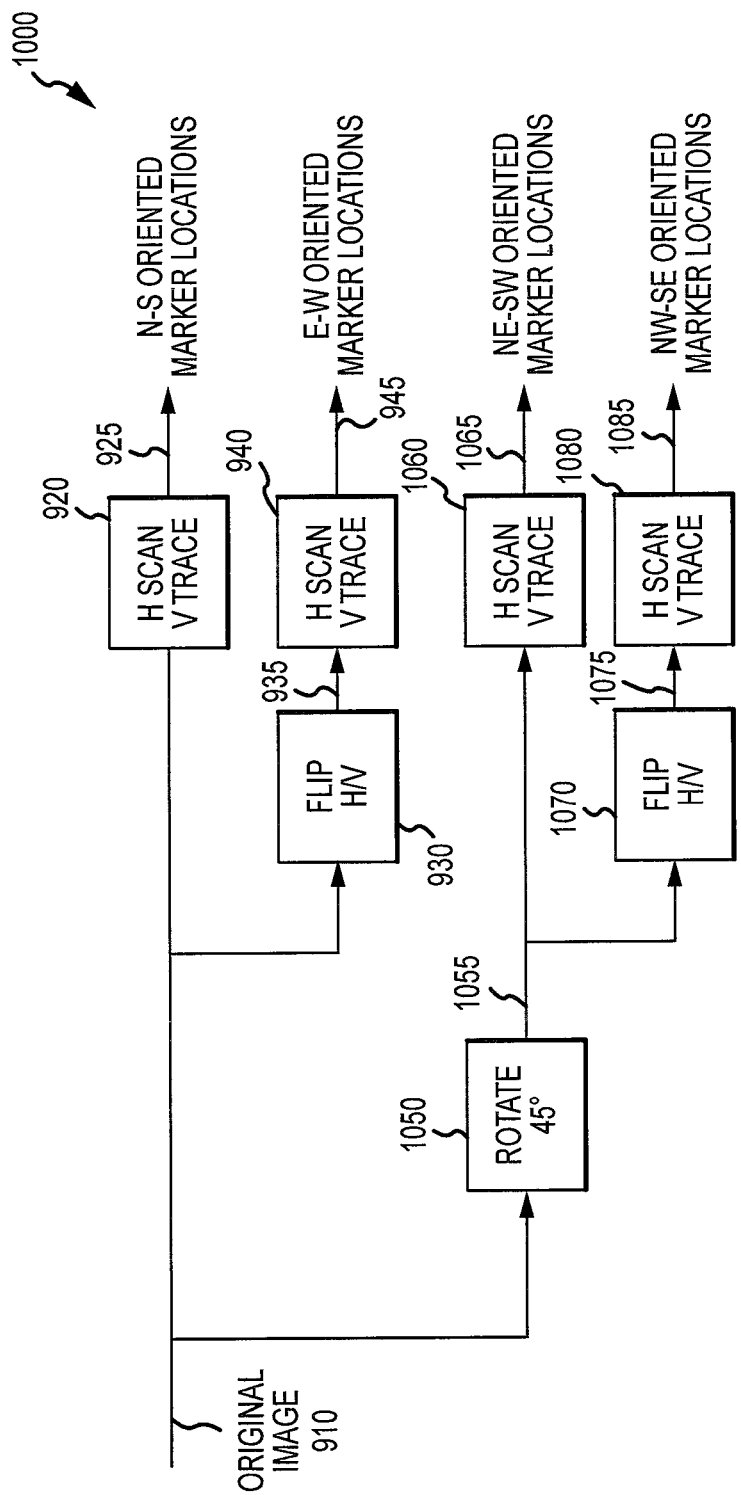

In practice, it may be difficult, though, to scan for markers with a plus or minus 45-degree range of orientation. The inventors recognized that is may be better or more practical (or realistic) to scan for markers in a range of plus or minus 30-degree range of orientations relative to vertical or horizontal. For example, a two-scan process such as process 900 may miss markers in a NE-SW direction. FIG. 10 illustrates a method for locating/identifying markers in an image using four scans rather than only two. The process 1000 builds upon or expands upon the process 900, which takes an original image 910 and outputs vertically and horizontally oriented markers or those markers with a N-S-oriented marker location 925 and with an E-W-oriented marker location 945.

Further, the method 1000 combines two more scans (or combines four scans total each at 45 degrees). As shown, the original image 910 is also fed to a module 1050 that rotates the image 910 by 45 degrees, and this 45-degree rotated image 1055 is provided as input to a module 1060 that performs a horizontal scan with a vertical trace to identify as shown at 1065 markers in the image 910 with NE-SW-oriented marker locations. The 45-degree rotated image 1055 is also fed to a module 1070 that flips the horizontal and vertical (or rotates the image 90 degrees) to provide image 1075 as input to module 1080 that performs a horizontal scan with vertical trace to identify markers with NW-SE-oriented marker locations at 1085. The identified markers or marker locations 925, 945, 1065, 1085 can be combined to provide a set of identified marker locations (or markers) in the image 910. In practice, efficient scans are effective at finding markers oriented quite closely to the optimal direction (such as vertical). Therefore, the scheme of method 900 may be expanded to a 4-scan scheme as carried out by method 1000. By rotating, for example, the image 910 by 45 degrees and applying the 2-scan scheme, one can be confident that the process 1000 will find all markers in an image 910, and the four sets of marker locations 925, 945, 1065, 1085 can be combined into a unified set.

In other cases, though, markers may be located in an image using skewing of the image rather than rotating the input or original image. Rotating an image can be performed reasonably efficiently, but the rotating operation often is not cheap with regard to processing effort. Also, efficient rotations may change the image scale. While this may not be especially problematic, it does mean that some of the scan parameters may have to be modified to suit the alternative scale, and it also means that the results may be slightly different from a true rotation since the scanning and tracing process will not be truly scale-invariant (even with appropriate parameter adjustment). An alternative and inexpensive approach is to skew the image prior to scanning.

Figure 11:
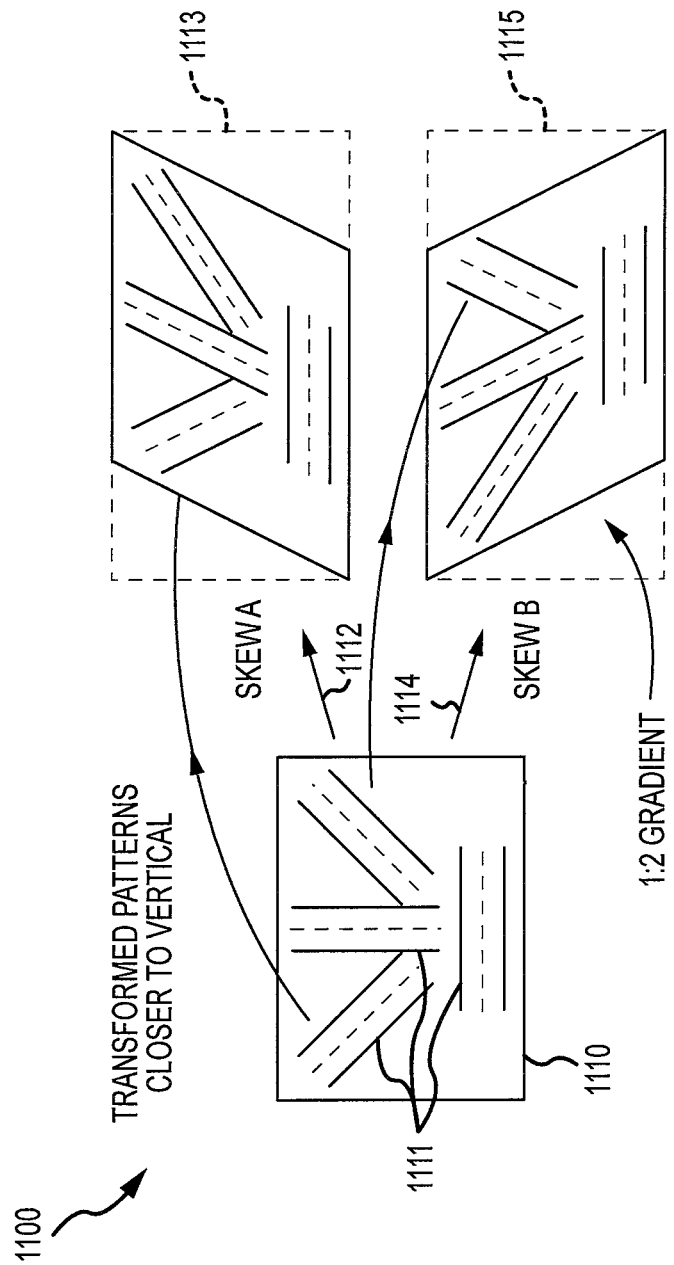
FIG. 11 illustrates an exemplary skewing process that may be performed by a skewing module or algorithm upstream of the scanning modules as part of marker location in an image.

FIG. 11 illustrates an exemplary and efficient skewing process 1100 (which may be performed by a skewing module or algorithm upstream of the scanning modules). The process 1100 provides a two-way skew transformation of an image 1110 (e.g., the original image from an onboard camera). The image 1110 does not have to be modified by rotation to bring markers 1111 closer to the trace direction (such as to the vertical direction). Instead, a skew transformation can be applied as shown with Skew A at 1112 that provides a first skewed image 1113 and with Skew B at 1114 that provides a second skewed image 1115 (with a different skew than image 1113). The transformation shown with process 1100 has the merit of simplicity. Only every other row needs to be resampled, and the resampling process is uniform across those rows. The results can be used for skewing in both directions as shown at 1112, 1114. Furthermore, no further resampling is required to skew the image 1110 in the other direction as shown at 1114. A scan that traces vertical markers will find markers in the top output image 1113 that are oriented in a NNW-SSE direction.

Figure 12:
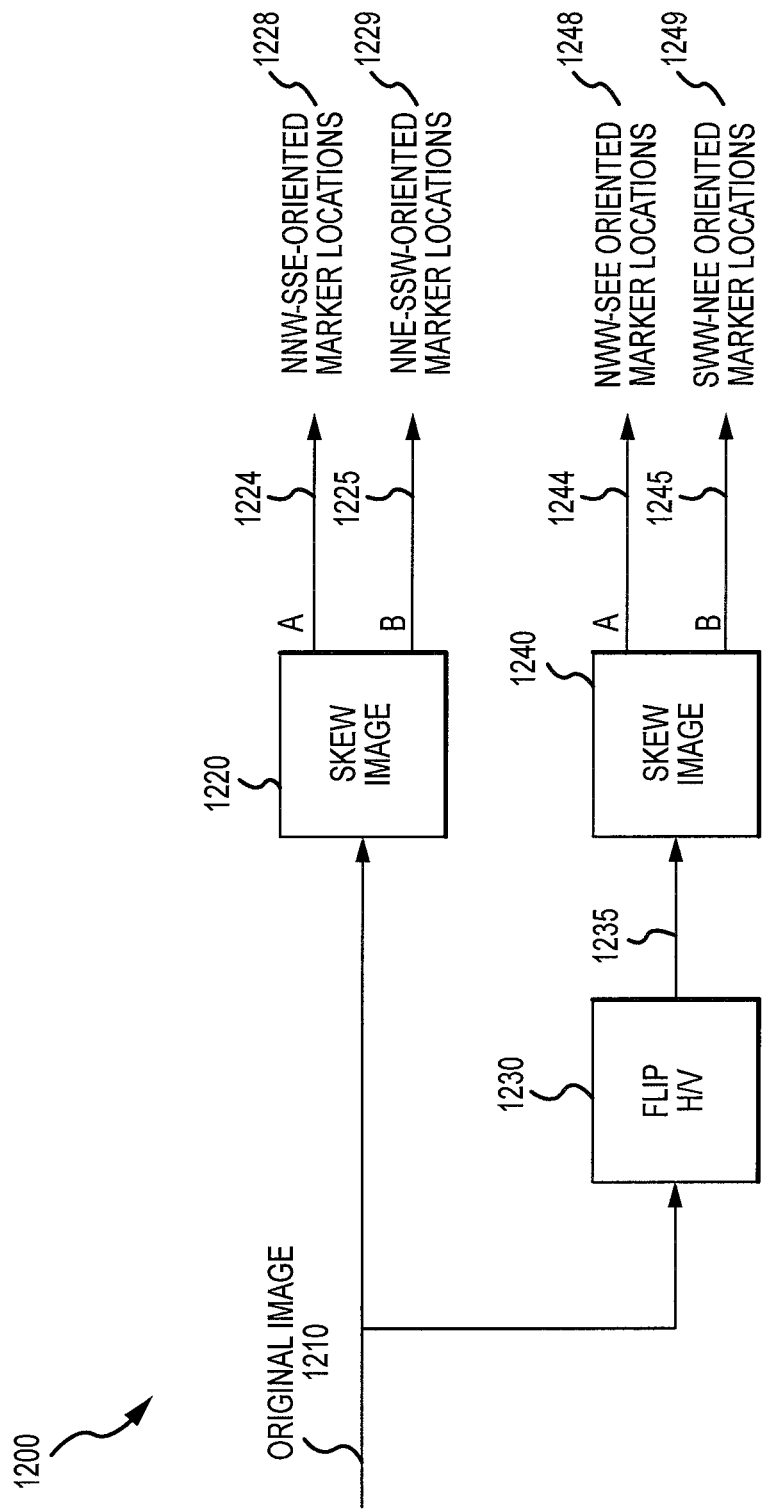
FIG. 12 shows a functional block diagram of a four-scan method for locating markers that makes use of a two-way skewing transformation as shown in FIG. 11.

Then, the skewing process may be incorporated in to a four-scan scheme or method 1200 as shown in FIG. 12 to locate markers. As shown, an original image 1210 with markers is provided as input to the marker location method 1200. The original image 1210 is skewed by module 1220 (e.g., as shown by method 1100 in FIG. 11) to provide Skew A and B images, and these are horizontally scanned with vertical tracing at 1224 and 1225 to obtain NNW-SSE-oriented marker locations 1228 and NNE-SSW-oriented marker locations 1229. The original image 1210 is also provided to module 1230 which performs a rotation to flip the horizontal and vertical of the image 1235 (when compared with image 1210). This flipped image 1235 is then skewed in two directions by module 1240 (as shown in FIG. 11), and the two skewed images are horizontally scanned and vertically traced at 1244 and 1245 to find the NWW-SEE-oriented marker locations 1248 and the SWW-NEE-oriented marker locations 1249.

The four sets of locations can then be unified into a single set of marker locations for the image 1210 as part of method 1200 or in a downstream module/routine. Thus, when incorporated into a four-scan scheme as shown in FIG. 12, the scaling seen by each scan will be the same, and the results should be consistent. One main disadvantage with skew transformations is that the image distortion will mean that the transfer of information from one scan line to the next may not be optimal, and this is especially true when scan lines are far from perpendicular to the marker direction. It should be noted that the two skew transformations may be used to rotate an image, too. Although not shown, an original image may first be horizontally skewed and then vertically skewed. Skewing the image in the same fashion first horizontally and then vertically yields a rotated image. This may be simpler to carry out in practice than rotating by 45 degrees and may be considered an alternative approach to the method 1100 of skewing shown in FIG. 11. Therefore, combinations of two-way transformations may be used to rotate an image to various angles. In some circumstances, these combinations could be applied very efficiently in parallel and, therefore, present little burden to the overall analysis process.

Figure 13:
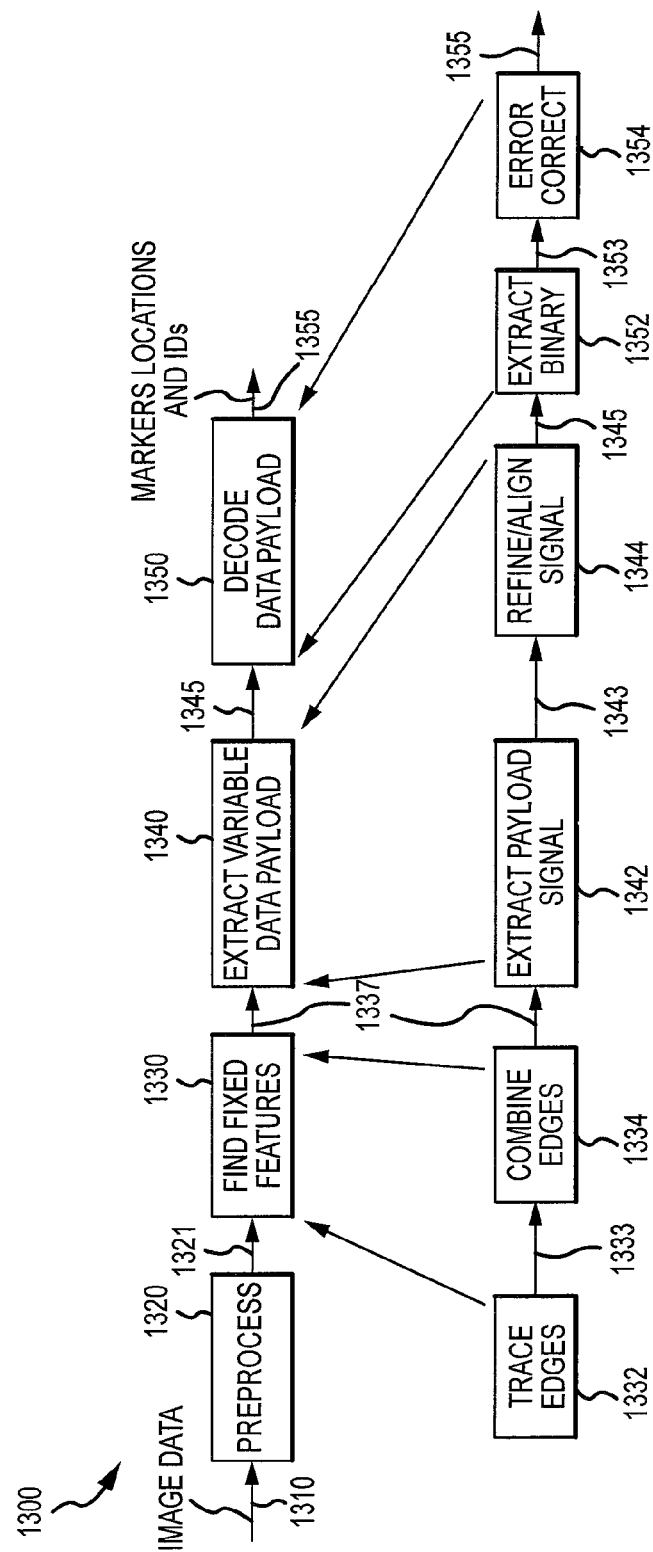
FIG. 13 shows a marker location and processing module and/or method (or algorithm) for use in determining positions of mobile devices using markers positioned within an operating space.

FIG. 13 illustrates a process 1300 for use in marker scanning and tracing (e.g., marker location process) with a wide variety of marker designs. The four main modules or operational blocks are: preprocessing 1320, finding fixed features 1330, extracting the variable data payload 1340, and decoding the data payload 1350. In FIG. 13, several of these blocks are broken down into subroutines or subblocks to facilitate further discussion of the operations taking place in each module/block. Briefly, after preprocessing the image 1320 (e.g., to compensate for lighting variations), the data 1321 is processed in module 1330 to identify the parts of the image that might be the fixed parts or patterns of one or more markers. Once candidate marker locations are known, this information 1337 is passed to module 1340 for processing the variable data areas or parts of the markers that carry the data to extract the payload of each identified marker. Then, this and other data 1345 may be passed to a decoding data payload module 1350 for application of error correction and other identification techniques to provide reliable identification and data decoding. The result or marker locations along with marker IDs are output at 1355 such as for use by a mobile device controller in directing the mobile device within an operating space relative to objects upon which the located markers were placed.

Initially, the image or image data 1310 is input to a preprocessing module or block 1320. This first stage of method 1300 involves compensating for variations and imperfections in the image 1310. In one exemplary algorithm or implementation of the method 1300, the image 1310 is thresholded by preprocessor 1320 such as with sub-pixel edge estimation. Further, the preprocessing module 1320 may carry the original image forward in its output 1321 to the module 1330 adapted for finding the fixed pattern of markers in image 1310.

The module 1330 is configured to look for the localization markers described herein that have fixed bars/stripes with a variable pattern of dots (variable data area) between the bars or stripes. Hence, the fixed feature module 1330 may be adapted to look not only for linear features or bars but to also look for appropriate relative spacing between the adjacent bars/stripes and adequate gap lengths (space for variable data area). The module 1330 may include a module/subroutine 1332 for tracing edges, and its output 1333 may be provided to a module/subroutine 1334 for combining edges. The output 1337 of the module 1330 is then passed to the module 1340 for extracting the variable data payload. With regard to the trace edges module 1332, the markers described herein are designed so that the tracing of edges is performed in one general direction. The scanning is performed up and down following the direction of edges in each case. The results are then combined at 1333. With regard to the combine edges module 1334, the markers have specific spacing of the bars/stripes so as to reduce false marker extraction. This is the problem that occurs when parts of the image look like markers when they are not markers.

The extract variable data payload module 1340 may be relative complex. The markers described do not typically have structure that indicates the precise shift of the data signals. The bars, for example, do indicate the lines along which the dot patterns lie (where the variable data area should be located on the marker relative to the fixed pattern features). If the markers are not aligned exactly with the trace direction, then the two (or other number of) lines of dots will have different offsets. The module 1340 may include subroutines/modules 1342 and 1344 for extracting the payload signal (and providing this output 1343 to module 1344) and for refining and aligning the signal, with the module 1340 output 1345 then provided to module 1350 for decoding the data payload to provide marker locations and IDs 1355. With regard to extracting payload signals with module 1342, the image data 1337 is processed to extract two 1-dimensional signals for the two rows of data dots. With regard to refining and aligning the signal with module 1344, the module 1344 is designed to find the correct offset (or phase, from a signal point of view) from a short stretch of noisy data. The period of the signals is estimated from the two combined, and, then, the offsets for each are estimated separately.

The decode data payload module 1350 may be broken down into a module 1352 for extracting binary as shown at 1353 and a module 1354 for correcting error to provide accurate marker locations and IDs at 1355. The main complication with providing the module 1350 is that it involves estimating the optimal threshold from the raw data using statistical moments. One advantage of this approach is that the threshold for a successfully decoded marker can be used to inform the adaptive thresholding applied during preprocessing by module 1320. Error correction performed by module 1354 can be provided using Hamming or other codes. One complication is that the sequence of 8 bits within each binary signal that is the code signal is not known, which can increase the complexity of the code to provide error correction with module 1354.

In performing the method 1300, it may often be useful to find the location of a maximum, and the method 1300 may utilize a parabolic fit technique. For example, a parabolic fit approach may be applied to the output 1333 of edge detection by module 1332. Once the image is filtered to create the matching data, maximum sampled values are found and then the locations of the true maxima are estimated using sub-pixel accuracy. Two relatively closely equal values may suggest that the actual transition is halfway between the two values. Estimating this sub-pixel location is potentially very useful; however, the estimation should be simple and fast. One can use cubic interpolation, but a simpler parabolic interpolation may be preferred. Once the location of the sample maximum is found, only the two neighboring points are considered. Furthermore, the peak is located by a simple ratio.

Figure 14:
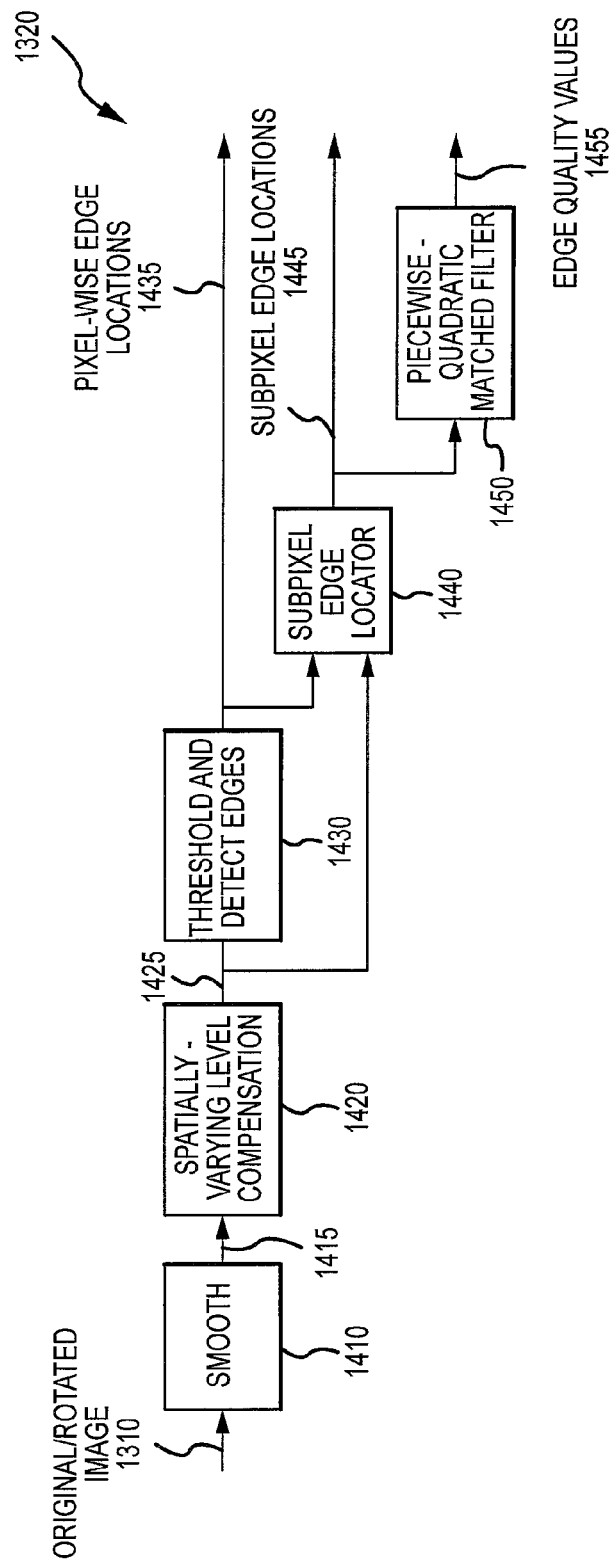
FIG. 14 illustrates a block diagram of processes carried out within an exemplary preprocessor or during preprocessing method such as that of the method of FIG. 13.

At this point, it may be useful to expand upon and explain in further detail portions of the process 1300 of FIG. 13. FIG. 14 illustrates the preprocessing stage or module 1320 (or functions it carries out) in greater detail as it is used to extract edge detection data from the image 1310 (which can incorporate tracking between frames). In the module 1320, the original image 1310 is processed by a first routine 1410 to provide smoothing. The smoothed image 1415 is then processed by routine 1420 that provides compensation for spatial variations, such as those arising from variations in prevailing light intensity. The compensated image data 1425 is provided to modules/routines 1430, 1440. Routine 1430 acts to provide thresholding and to detect edges to output pixel-wise edge locations 1435. In contrast, routine 1440 determines sub-pixel edge locations 1445 based on input data 1425, 1435. A filter 1450 is provided to processes the sub-pixel edge location data 1445 to generate edge-quality values 1455. In this manner, the preprocessor 1320 provides thresholding of the image in a manner that retains some of the sub-pixel location information. The sub-pixel location of the crossing of the threshold is identified by linear interpolation between the pixel values on either side. Application of the matched filter 1450 is provided with efficient calculations for sub-pixel threshold transitions.

It was understood that practical image gathering resulted in wide variations in contrast. As a result, the magnitudes of changes may not be reliably significant as indicators of edges in an image. Therefore, a combination of thresholding and of a method of retaining the location of the threshold transition may be used. A matched filter 1450 with a piece-wise, parabolic shape is used since it can be efficiently implemented for floating-point transition locations. With regard to the parabolic matched filter 1450, at each pixel, it is known not only if there is a transition in the threshold image but also a location within the pixel's scan at which the transition is estimated to occur.

A fundamental desideratum is that sub-pixel accuracy should be preserved. Fast and simple calculation is desired based on a fractional estimate of the point at which a transition occurs in the thresholded image. In other words, with some quantization, the signal transitions between 0 and 1 but not necessarily at sample points. The likelihood of a transition at a sub-pixel location can be estimated by matching with a filter, such as a filter with four parabolic pieces. When integrated and filtered by a step function, the matched filter takes a shape that is close to a raised cosine, and the raised cosine has a pretty reasonable roll off with a cut off of the frequency 4. Since padding to 8 pixels is typically used, this frequency is half the sampling frequency. While not provided in further detail, the concept behind some implementations of the parabolic matched filter is that the lines in the thresholded image are essentially a sequence of steps that occur at fractional (sub-pixel) locations.

It will be understood that in the process 1300 of FIG. 13 that the tracing edges module 1332 is a relatively key or pivotal portion needed to provide the set of marker locations and IDs 1355. One issue is that edges can be at any angle, and there is a need for confidence that there is an edge in a particular location if it is part of a fairly straight edge. In the middle of the edge, this confidence depends on the data extending either way. The trace edge routine/module 1332 may be thought of as being an expansion of (or of being inspired by) the Baum-Welch forward-backwards methods (which are state probability estimation methods). In preliminary tests, the inventors did not find that a literal probability estimate worked well. Nonetheless, the inventors found it very effective to trace edges in opposing directions and to then combine the results point-by-point.

Figure 15:
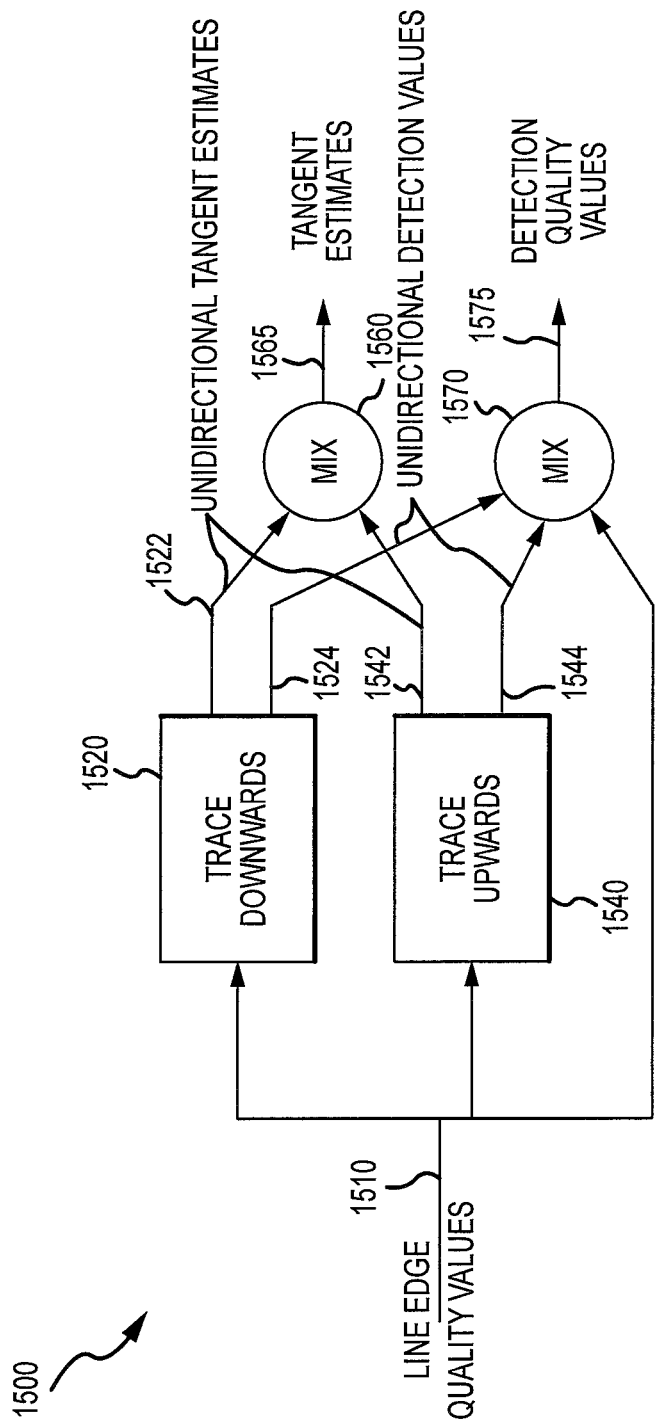
FIG. 15 illustrates an edge tracing process as may be performed by an edge tracing module or block of the module/method of FIG. 13.

One overall edge tracing process 1500 that can be carried out by module 1332 is shown in FIG. 15. As shown, line edge quality values 1510 are fed into modules/blocks 1520, 1540 for tracing downwards and upwards, respectfully. The unidirectional tangent estimates 1522, 1542 are output from these tracers 1520, 1540 and mixed at 1560 to provide a set 1565 of tangent estimates. Likewise, the unidirectional detection values 1524, 1544 are output from the tracers 1520, 1540 and mixed at 1570 to provide a set 1575 of detection quality values. The tracing blocks 1520, 1540 (downwards and upwards) loop through the rows.

Figure 16:
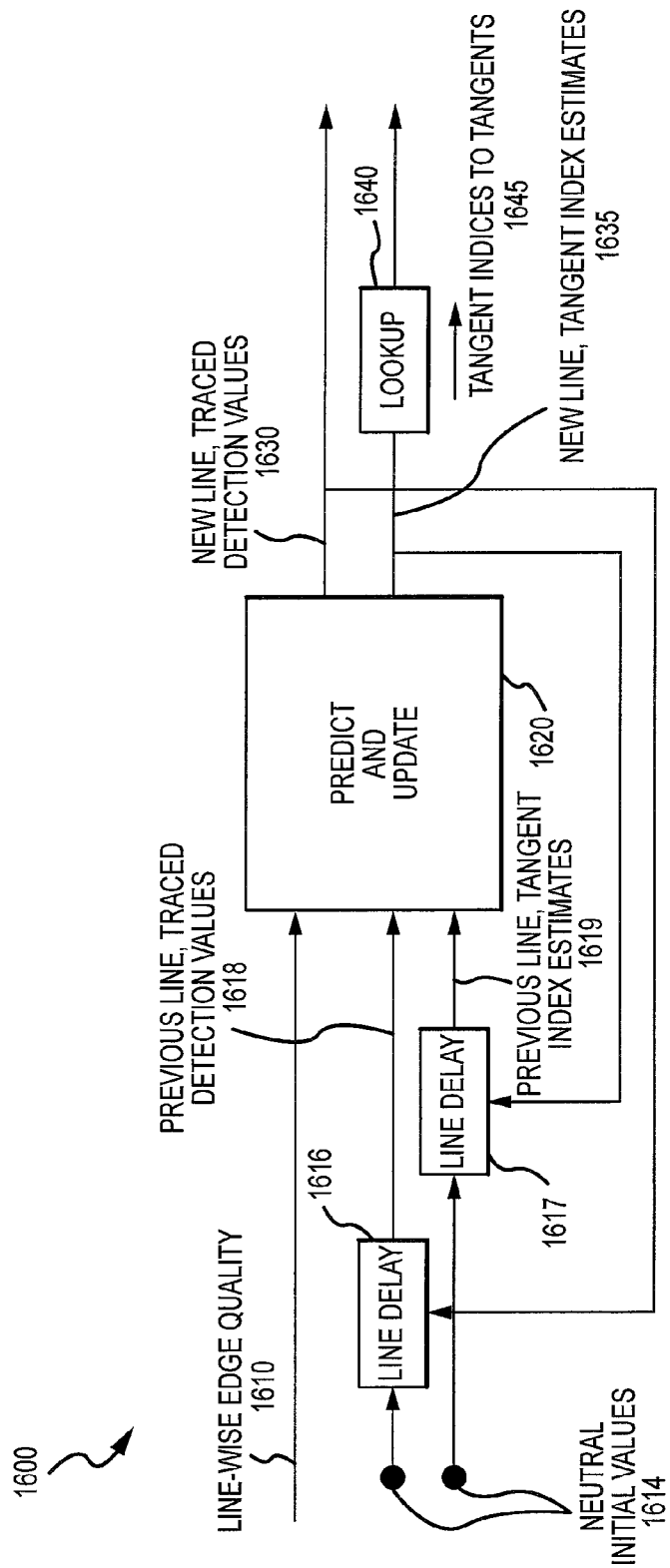
FIG. 16 illustrates a row-by-row tracing process as may be performed by the edge tracking module or block of the module/method of FIG. 13.

Within these loops, the tracing process 1600 of FIG. 16 is executed for each row, and process 1600 provides tracking of the angle of edges as they are traced in which these angles are expressed as tangents. The tracing process 1600 provides row-by-row edge tracing for a single direction. As shown, line-wise edge quality data 1610 is input to a module 1620 that is adapted for predicting and updating the edge detection data to provide new line, traced detection values 1630 and new line, tangent index estimates 1635. A lookup module 1640 is provided to provide tangent indices to tangents 1645. Line delays 1616, 1617 are provided to process the neutral initial values 1614 and provide as input to the predict and update module 1620 previous line, traced detection values 1618 and previous line, target index estimates 1619. The line delays 1616, 1617 remember the data from the previous line, which is above or below the current line depending on the direction.

In process 1600, the tangent says how much the content of one row is expected to be shifted in order to predict or match the next row. Consequently, the tracing process 1600 tracks the following two pieces of information: (1) the confidence in there being an edge at each location based on new data and past tracing and (2) the estimated tangent for each point along the line (how much does the edge/bar shift or what is the angular orientation of the bar/stripe in the image). The tracing machine or module 1600 progresses line-by-line, consuming a new line of edge match data from the input image with each step. Note, the tangents are expressed in real numbers that are scaled so that one can, for example, round the real numbers to integers and then use the results as indices into access filter banks with approximate filters.

Figure 17:
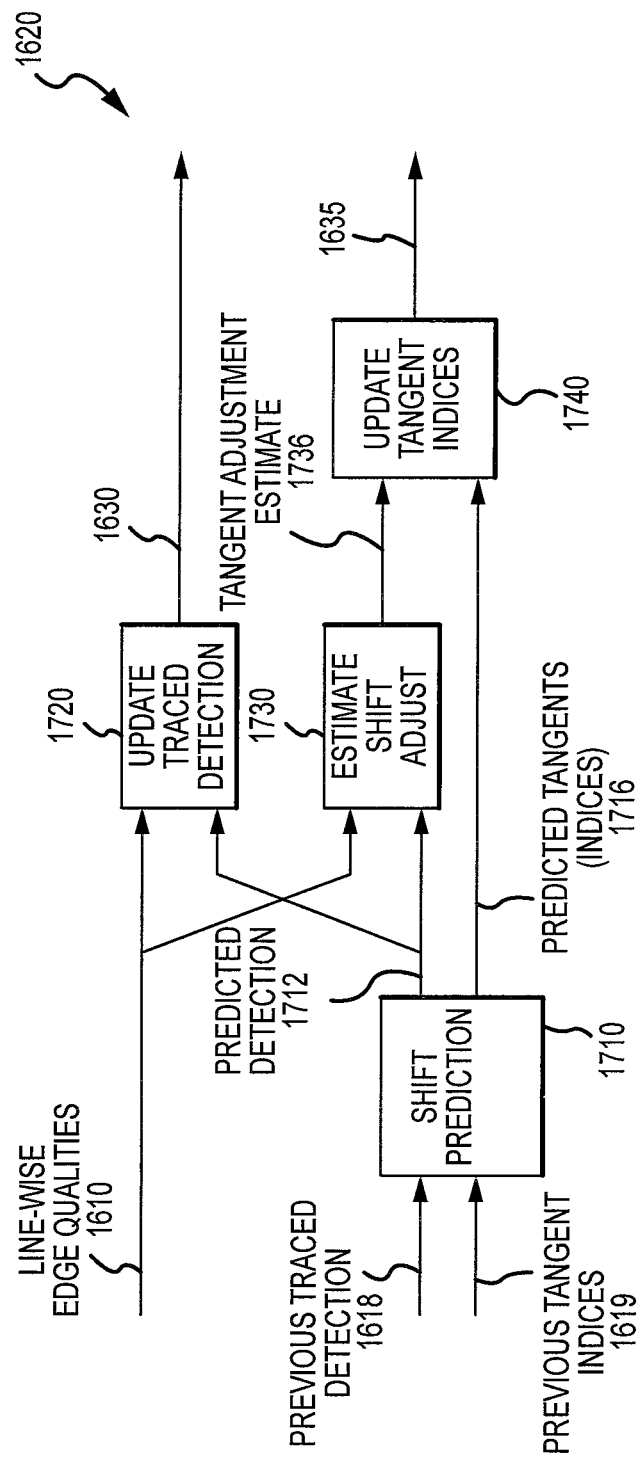
FIG. 17 shows a functional block diagram of the prediction and updating process of FIG. 16 in further detail.

The prediction and updating process provided by module 1620 is applied for each pixel along the row, with further detail to the steps/functions involved in this process shown in FIG. 17. A core feature of the tracing process involves predicting the state and updating it based on the new line of image match data, with it being remembered that the state is the combination of edge confidences and the tangents. The update is broken down in more detail in FIG. 17. As shown, the inputs 1610, 1618, 1619 are fed into the predict and update block or module 1620. A shift prediction 1710 is performed to provide predicted detection 1712 and predicted tangents 1716. An update traced detection 1720 is performed using the line-wise edge qualities 1610 and the predicted detection 1712 with the result output as shown at 1630. An estimate shift adjust 1730 is performed to generate a tangent adjustment estimate 1736, and the tangent indices are updated at 1740 and output from the predict and update module 1620 at 1635. The updating 1740 may be performed in terms of indices into the tangent and filter arrays, and the update may be chosen based on the adjustment quantity.

As can be seen in FIG. 17, the edge and tangent data from the previous line is used to generate forward predictions of the same data for the current line. The edge detection values are combined with those for the current line yielding updated edge detection. For the tangents, a two-stage process is applied. First, the predicted edge detection is matched with that of the current line to estimate how much "reality" of the new line is shifted from the prediction. This is then used to update the tangents, as expressed as indices.

Figure 18:
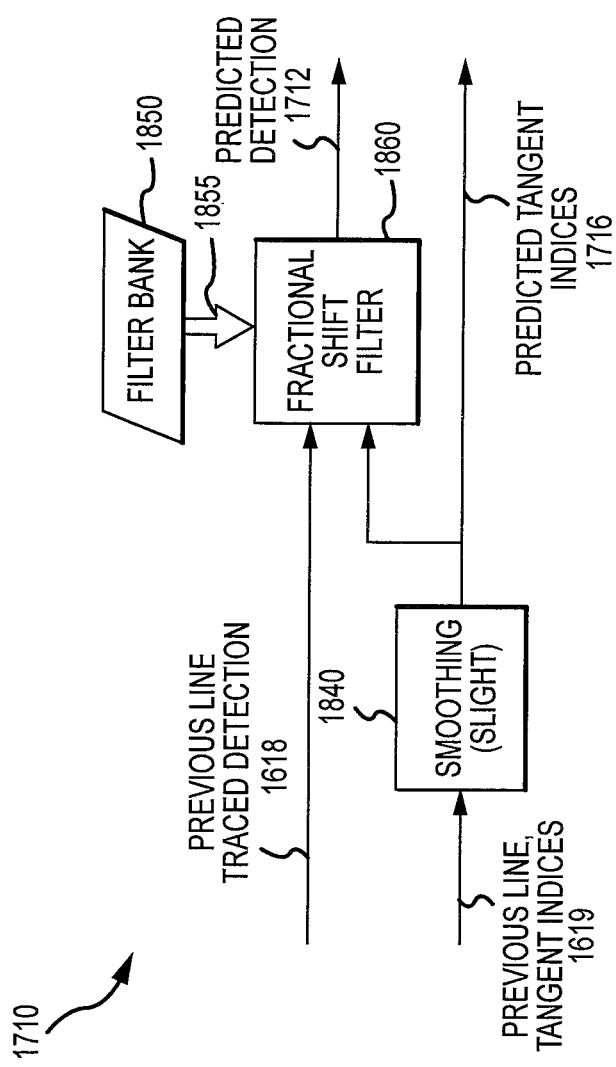
FIG. 18 is a functional block diagram of the shifted edge prediction that can be performed in the prediction and updating process of FIG. 17.

FIG. 18 illustrates processes/modules used within the shift prediction module 1710. As shown, the shift prediction module 1710 processes the previous line tangent indices 1619 (copies value) with a smoothing algorithm 1840 to provide the predicted tangent indices 1716. A filter bank 1850 (e.g., a polyphase, low-pass filter bank that is useful for providing ideal shift on sub-pixel level) is used to provide input to a fractional shift filter 1860, which takes as input the previous line traced detection 1618 and the predicted tangent indices 1716, and using the filter bank input 1855 to filter this input to provide the predicted detection 1712. As can be seen, edge detection values are predicted from the previous line. The edge detection values are shifted by filtering, e.g., in the fashion of resampling, according to the predicted tangents. The shift prediction module 1710 uses the tangents of the previous line to shift the previous state in order to guess the state for the new line. It may be acceptable and stable to use the previous line's tangents as the prediction for the new line, with a little bit of smoothing. The resulting tangent state is then used, via rounded indices for example, to access a bank of FIR or other filters that apply low-pass filter shifting of the previous line's edge detection confidences.

Figure 19:
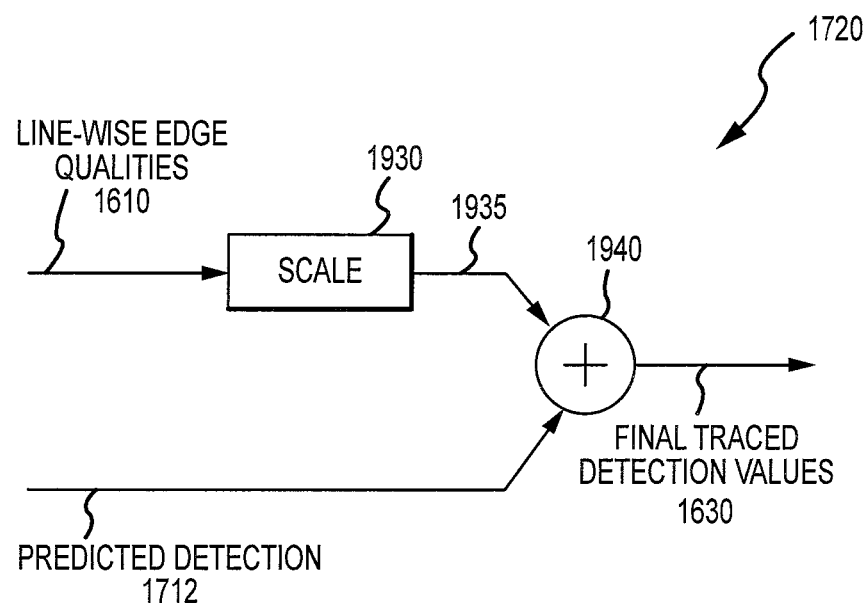
FIG. 19 is a functional block diagram of the traced detection updating that can be performed in the prediction and updating process of FIG. 17.

FIG. 19 illustrates the steps or modules performed by the module 1720 of the predict and update block 1620 to perform updating of the traced edge detection. The line-wise edge qualities 1610 are scaled at 1930 and the scaled output 1935 is provided to a mixer/adder 1940 along with the predicted detection values 1712. The result is the final traced detection values 1630. The processes performed by module 1720 may be thought of as simply a weighted sum of predicted values and new data. The weightings implement a first-order AR filter, which is equivalent to a filter with an exponentially decaying impulse response. In other words, the module 1720 implements a kind of AR filter such as one with exponential decay. The previous "output" is processed to scale it down slightly and a scaled amount is added to the new "input." The previous output is the predicted edge detection 1712. Rather than scale in this block, one can move it and combine it with the filters used in the prediction block. Strictly speaking, this involves updating a slightly scaled down amount of the edge prediction.

Figure 20:
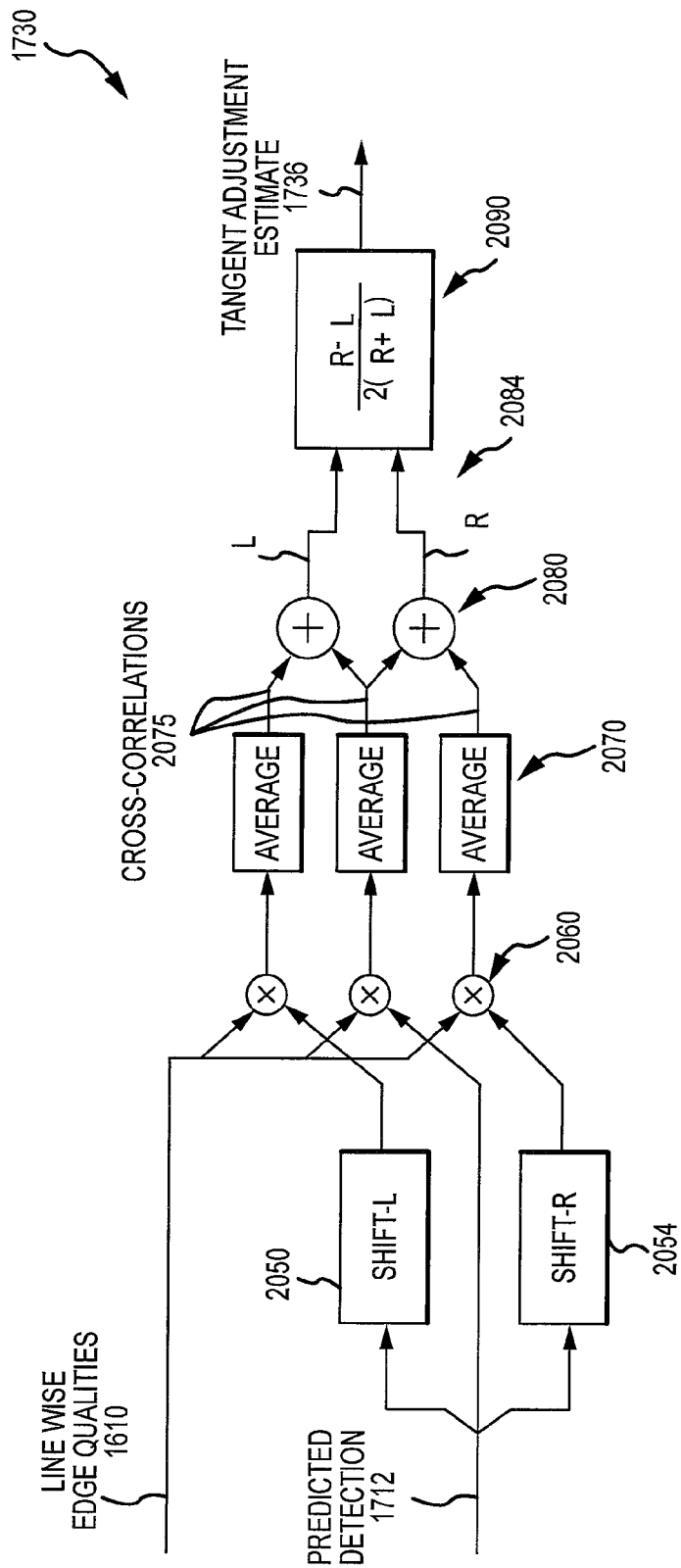
FIG. 20 is a block diagram of the shift adjust estimating process that can be performed in the prediction and updating process of FIG. 17.

FIG. 20 illustrates processes or modules that may be used to carry out the estimating of the adjustment to the shift and, hence, to the tangents by module 1730 of the predict and update block 1620. As shown, the predicted detection 1712 is processed with a left and right shift mechanism 2050, 2054. Multipliers/combiners 2060 are applied to the shifted predicted detection values along with the line-wise edge qualities 1610, and then at 2070 these values are averaged to obtain cross correlations 2075. The cross correlations 2075 are added/combined at 2080, and these combined correlations 2084 are processed at 2090, e.g., using a parabolic fit method to obtain peaks, to provide the tangent adjustment estimates 1736.

FIG. 20 shows how one may estimate how far off is the shifting prediction. To this end, a cross-correlation match may be applied to a window about each pixel. The match is calculated between the shifted detection confidences and the new image edge detection data. The match is also calculated (again for a small window) for shifts of one to the right and left. If the prediction was good, then the match without further shifting will be the highest and, therefore, the best. To estimate the peak of the match from these three data points, parabolic fitting may be applied. This peak is an idealized update to the tangents (but, it may be vulnerable to the noise of the image edge detection values).

Stated differently (or again), the predicted edge detection values are cross-correlated with the edge detection values in the new current line. This involves multiplying corresponding values and averaging over a neighborhood window. The process is performed for corresponding location and for a shift to the left and the right. If the prediction is accurate, the middle value should be greatest and the values to the left and right should be approximately equal. A parabolic fit is, therefore, used to estimate the optimal shift amount. Since this is being added to the predicted tangents, these are update adjustments.

Now, it may be useful to explain the process of combining edges as performed at 1334 in method/algorithm 1300 of FIG. 13. The module 1334 may be thought of as combining the edge data by: (1) finding significant edges along the rows and (2) tracing patterns between rows. The edge data is in a 2D array in some cases, and, in order to be more efficient, the data can be processed using iterative 1D passes. First, the detection values can be combined along rows and across edges. Second, the edges between rows can be traced out.

Finding significant edges (step (1) above) may be thought of as involving: (a) characterizing candidate edges; (b) removing the edges that are individually insignificant; (c) removing middle edge of three fairly insignificant edges; (d) cleaning up the results; and (e) estimating the fraction locations to obtain traced detection values and fractional edge positions (which would be in the output 1337 of FIG. 13). Step (a) or the first stage provides initial edge significance values and locations. Edges with low significance are then removed (at Step (b)) and edges in the middle three insignificant edges are removed (in Step (c)), which means, for example, a fairly significant edge in between two significant ones is not removed. It may be that two desirable strong edges have a weaker vague edge in between. The data is cleaned up (in Step (d)) and the fractional location of each edge is estimated (in Step (e)) from a parabolic fit of the edge detection values around the peak.

Hence, it can be seen with regard to the combining edges portion of the marker location process that one may be starting with a 2D array (like an image) that has edge detection confidences in each pixel. The values are signed such that a strongly negative value indicates strong confidence in a downwards (often white to black) transition. The edges are traced, first across and then along the edges (as discussed above for Steps (1) and (2)).

To combine across edges, the edge detection values may be combined into aggregate values along rows (as discussed above for Steps (a) to (e)). Step (a) of this process may involve taking as input the edge detection values and segmenting these into positive and negative sections. Each of these sets of sections is processed to: locate the absolute maximum per section so as to provide a peak location and sum squares by section to provide peak significance (per section). In other words, Step (a) provides characterization of candidate edges along an image row. This divides the row into segments. A new segment is started whenever the sign of the detection values changes. In many cases, there is strong evidence for an edge but weak information about its precise location. Therefore, the confidence in the presence of an edge in a segment is characterized by the sum of the squared detection values. The location of the maximum is used as the location, but only to pixel accuracy at this stage.

Along each row, each section of detection values with the same sign is combined to find the location of the maximum and total (squared) detection. Insignificant edges are removed and replaced by the more significant of the two sections on either side. First, edges that have low significance are removed, and, second, edges are removed that are more significant but in the middle of a sequence of three fairly insignificant edges. This process may not be quite symmetric and is often applied left to right.

Now with regard to tracing patterns (or Step (1) above), there are two main concepts behind the pattern tracing process. First, patterns are considered acceptable, at least initially, if their widths and other row-wise characteristics pass certain tests. Second, it is relatively expensive to identify new candidate patterns and cheaper to limit tracing to those already in the candidate set. Therefore, it may be useful to only scan every few lines (e.g., every 8 lines) for new candidates. This distance should typically be small enough that small patterns are not missed because they fall between two seed lines. A set of candidate patterns may be maintained, with notation of which is active at any time. Tracing patterns in rows may involve seeding the tracing process with a subset of starting rows (e.g., iterating over every k-th row). A set of patterns is maintained as the process progresses. The set may be augmented with new patterns. In order to do this, candidate patterns may be found and these may be verified as new. After new patterns are found, the new patterns may be traced upwards as far as possible/practical, and then all patterns can be traced down to the next seed line.

A principle test of patterns is the relative position of edges. The "goodness" of a combination of edges can be checked by considering the relative lengths of the left and right bar widths along with the relative length of the extent in between. The number of edges in the central region is also limited. A new candidate pattern can be constructed from two edges that make up a possible right bar. Scanning along edges for candidate patterns may involve iterating over every pair of segments (candidate edges) in the row and testing to see if it is an acceptable candidate for a right bar in the pattern. After finding the right two edges, it uses the distance between them to look by location for two candidate edges to the left. The relative widths are checked as well as the number of edge transitions between to determine if the combination of edges is acceptable.

In one implementation, the search for left bars may be performed according to the following condition: $3w_L \le e \le 4.5w_R$. In addition, there may be a requirement that there be no more than two bars in between the left and right bars and: $0.75((w_L+w_R)/2) \le w_L \le 1.25((w_L+w_R)/2)$. The patterns may next be traced upwards. The pattern set operates with a set of active patterns. This information can be saved and restored since the upwards trace only operates on new patterns. The actual tracing process may be the same for both directions of tracing, e.g., for a given direction, the new line is traced for all patterns. The tracing process for a single pattern includes a first step of looking for edges in the next line (above or below). These may be directly in line with the current four edge locations or one pixel to the right or left. The pattern is deactivated for either of two reasons: (1) if there are not four acceptable edges within range or (2) if the widths fail the relative length tests. The patterns are then traced downwards, which may be a simpler version of the upwards trace as it only iterates until the next row that will be used for seeding new patterns.

Once the edges are combined, the method 1300 continues with extracting payload signals at 1342. In some cases, extracting the payload of an identified marker may be performed without averaging pixels. Extracting signals may include first filtering the patterns to remove those that are unlikely either to be a true pattern or are too distorted to extract the data payload (e.g., get rid of markers that are not long enough). Then, the image data is pulled out where it is expected that the data payload (or variable data area/pattern) exists in the marker. This may involve pulling out the two signals between fixed bars/stripes of a marker. The data payload in the markers described herein may take the form of two lines of bit squares. In these cases, one can trace along the pattern looking at the inner edges of the fixed bars. The centers of the bits should lie at two known distances between the pair of innermost bars/stripes (e.g., at a distance $3/8$ and a distance of $5/8$ of the overall separation distance between these two bars/stripes).

The removal of patterns may be performed to remove those that appear erroneous (false positives) or are distorted in the image. This can be done by looking at the ratio of the average width and length and rejecting the patterns that are too short. While a simple approach, this technique has proven in practice to be effective in removing the unsuitable candidate patterns. In brief, pulling out the raw payload data involves creating two signals, one for each of the payload lines in the variable data area of the marker. These are the image values where the centers are expected to be between the fixed side bars in each pattern.

With regard to the refining/aligning signal step 1344 of method 1300, this may begin with transition edges and signal alignment. This stage may begin with two signals that (should) have the same period but have different phase offsets and unknown padding. Hence, it is useful to refine and align the signals before decoding. This process can be rather elaborate or involved, mainly because the beginning and end of each data payload pattern are not known in advance. The general concept is the period and phase of the two signals can be estimated using the locations of the transition edges. The information for the two signals can be combined when calculating period, and, then, the two offsets can be calculated individually.

The alignment may be based on estimates of the period and phase, and these are extracted using an assessment of the likelihood of there being a binary transition near each time point. This may involve locating and selecting maximal edges such as by selecting the top n edges from a smoothed edge-detection filter and estimating their sub-pixel location using parabolic fitting. An additional filter can also be applied. If two peaks occur closer together than a set exclusion interval, the larger is passed and the smaller removed. In some cases, an edge detection filter is used to generate estimates of fractional transition locations. It was found that, with noisy data, the process was swamped or overwhelmed by small low-confidence transitions, even though subsequent processing is weighted by that confidence. Hence, it may be better to ignore the unlikely transition locations completely and simply select the n locations with the highest confidence. With noisy data, the variations in confidences can result in the same peak being selected twice, and, to address this issue, an exclusion interval may be applied.

With regard to estimation based on weighted locations, estimating the period and the two phases involves quite a large number of steps, but these are conceptually relatively uncomplicated. Both the period and the offset estimates are based on histograms weighted by transition confidences. The histograms are calculated in an up-sampled form, e.g., with many bins per integral time point. Once the maximum of a histogram is calculated, the final estimate is made using the parabolic fit method. There are few data points in the histograms, and, hence, they need to be heavily smoothed to even out the consequential irregularities.

The period estimate is based on the combined set of transitions from both signals. The histogram is a type of auto-correlation, which is based on inter-transition distances. This creates a set of absolute distances between every pair of the selected edges, along with weights calculated from the products of the two signal edge detection values. This set is further augmented with the same distances scaled down by 2 or 3 with adjusted weights. A set of weighted location differences is created and, then, augmented using the same data points with scaled distances and reduced weights. The rationale behind this is that patterns are generally similar to 1010101 and often are more like 1100110011. Thus, many of the inter-transition distances are twice the signal period.

The augmented set of inter-transition distances is processed into a histogram and smoothed. The set of distances and weights are used to calculate a weighted histogram. The set is quite small and, so, the histogram is irregular. A substantial amount of smoothing may be required. Note further that the histogram is up-sampled in order to make good use of the fractional inter-edge distance information. The estimate of the period basically comes from the maximum of this histogram. However, it is better to weight the histogram as part of estimating the payload period. This is because the process that generates it tends to bias smaller transitions, and, the techniques taught may include applying a weighting function that is exponential across the distance. The maximum of the smoothed up-sampled histogram of weighted inter-edge distances is used as the period estimates, with a couple of refinements. First, the maximum is selected from an emphasized histogram. This weights the histogram to favor longer distances. The weighting function is an exponential. The histogram around the selected peak is used to find a fractional distance, once again using parabolic fitting.

The estimate method for the offsets is simpler and based on the absolute transition locations. The period estimate may be used, however, to normalize the locations to a 0-1 interval. Estimating each payload offset may be performed similar to period estimation. The weighted histogram for each signal may be calculated, and the edge locations in the estimate period are used for the histogram, which is cyclic.

With regard to the step 1352 of extracting the binary, this may involve estimating the optimal threshold for a binary signal that has been smoothed and corrupted by noise. The general idea is to use the mean, variance, and skewness to characterize the mixture of two distributions. This may involve using a mixture of Gaussians along with estimates of mixture centers and proportions (line heights) to estimate an optimal threshold. The signal may be divided into segments, and each is thresholded, using the optimal threshold (which may be calculated for all the data points between the two signals). The initial alignment between the two binary signals may be chosen by padding according to the difference between the two offset estimates. As part of binary extraction, the signals may be converted into binary sequences by the method of thresholding the average of each segment. The threshold may need to be estimated. Further, the signals may be padded so as to align them minimizing the offset that has been applied. For example, if the estimated offsets were 0.1 and 0.9, these can be adjusted to 1.1 and 0.9.

Error correction at 1354 of method 1300 of FIG. 13 may involve decoding the binary signals so as to account for three unknowns: (1) the subset of the input signals that contain the payload data; (2) the relative offset of the payload data within the two signals; and (3) the orientation of the payload data, which is reversed if the marker pattern is rotated 180 degrees in the image. The decoding and checking routine may be applied to each case. With regard to performing error correct and decode, it may be an unknown where the data lies within the binary signals, and, as a result, various 8-bit windows may be tried around the center. Then, for each window, shifts by one can be tried between the two signals. The process may involve selecting bits, decoding, checking, and then appending. The required 8 bits from each binary signal may be selected and then concatenated. The marker may be rotated 180 degrees and then ID decoding and checking may be applied to the signal in both directions.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A localization marker adapted for identification with a single scan direction, comprising:
   a body with an exposed surface; and
   a marker pattern provided on the exposed surface, the marker pattern including:
      a fixed pattern; and
      a data area comprising a variable pattern, wherein the fixed pattern comprises a pair of parallel, linear features that are spaced apart a predefined distance, wherein the data area is sandwiched between the pair of linear features, wherein components of the variable pattern are positioned at predefined offsets from inner edges of the pair of the linear features, and wherein each of the linear features has a length greater than a maximum length of the components of the variable pattern.

2. The localization marker of claim 1, wherein the linear features comprise elongated bars with a width of at least 1 pixel.

3. The localization marker of claim 1, wherein a width of the linear features is at least 20 percent greater than the maximum length of the components.

4. The localization marker of claim 1, wherein each of the linear features is positioned on the exposed surface to extend a distance beyond opposite ends of the components of the variable pattern.

5. The localization marker of claim 1, wherein the components comprise lines extending parallel to each other and to the linear features and wherein each of the lines is positioned at one of the predefined offsets from the inner edges of the pair of the linear features.

6. The localization marker of claim 1, wherein the fixed pattern further comprises second and third pairs of linear features, wherein the linear features extend parallel to the pair of linear features outside of the data area, and wherein, on each side of the data area, adjacent ones of the linear features are spaced apart a second predefined distance greater than about 1 pixel.

7. The localization marker of claim 6, wherein each of the linear features of the fixed pattern has an equal length greater than the maximum length of the components of the variable pattern.

8. A system for facilitating determination of positions of mobile devices such as unmanned aerial vehicles within an operating space containing a number of objects, comprising:
   at least three markers placed on exposed surfaces of the objects, wherein each of the markers includes a pattern of linear bars adjacent a data area, wherein the pattern of linear bars is identical on each of the markers and the data area has a pattern that varies between the markers and wherein the pattern of linear bars comprises at least a pair of spaced apart and parallel bars disposed on either side of the data area;
   a mobile device operable to move about the operating space in response to control signals; and
   a controller on the mobile device generating the control signals based on a determination of a position of the mobile device within the operating space relative to locations of the markers, wherein the controller executes a localization module to locate each of the markers, to extract data from the pattern of the data areas, and to estimate the position of the mobile device based on the extracted data.

9. The system of claim 8, wherein the localization module uses a single direction scan of an image to locate the markers in the image and wherein at least one of the markers is positioned to be oriented in the image such that the pattern of linear bars is non-orthogonal to the single direction scan.

10. The system of claim 9, wherein the localization module repeats the single direction scan on a rotated or skewed version of the image to locate the markers in the image.

11. The system of claim 8, wherein the pair of parallel bars extends a distance beyond each exposed end of the pattern in the data area.

12. The system of claim 11, wherein the pattern of each of the data areas comprises one or more linear patterns extending parallel to inner edges of the pair of spaced apart and parallel bars and at predefined distances from the inner edges.

13. The system of claim 11, wherein the pattern of linear bars comprises parallel stripes on either side of the data area and wherein adjacent pairs of the parallel stripes are spaced apart a predefined distance.

14. A method for locating markers in an image of an operating space for a mobile device, comprising:
   with a processor on the mobile device, preprocessing an image to generate a set of image data;
   with the processor, locating fixed features of markers by tracing edges of the fixed features; and
   with the processor, extracting variable data payloads of each of the markers associated with the located fixed features,
   wherein the fixed features of each of the markers comprise a pair of parallel lines extending along opposite sides of a data area containing the variable data payload.

15. The method of claim 14, wherein each of the parallel lines extends a distance beyond each exposed end of the data area.

16. The method of claim 14, wherein the preprocessing comprises rotating or skewing the image to provide a rotated or skewed version of the image with the set of image data.

17. The method of claim 14, wherein the preprocessing comprises sub-pixel edge detection.

18. The method of claim 14, wherein the locating further comprises performing a horizontal scan of the set of image data and then performing the tracing of the edges, wherein the tracing of the edges comprises performing a first vertical scan downwards and a second vertical scan upwards.

19. The method of claim 14, wherein the tracing of the edges is performed row-by-row for a single direction and wherein a predicting and updating process is performed for each pixel along a traced row.

* * * * *